(12) United States Patent
Shiraki et al.

(10) Patent No.: US 11,140,294 B2
(45) Date of Patent: Oct. 5, 2021

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: Brother Kogyo Kabushiki Kaisha, Nagoya (JP)

(72) Inventors: Tomomi Shiraki, Nagoya (JP); Satoko Ando, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/580,769

(22) Filed: Sep. 24, 2019

(65) Prior Publication Data

US 2020/0099819 A1 Mar. 26, 2020

(30) Foreign Application Priority Data

Sep. 25, 2018 (JP) .................................. 2018-179278

(51) Int. Cl.
*H04N 1/333* (2006.01)
*H04L 29/06* (2006.01)
*H04N 1/327* (2006.01)
*H04N 1/00* (2006.01)

(52) U.S. Cl.
CPC ... *H04N 1/33346* (2013.01); *H04L 29/06027* (2013.01); *H04N 1/00217* (2013.01); *H04N 1/32797* (2013.01)

(58) Field of Classification Search
None
See application file for complete search history.

(56) References Cited

U.S. PATENT DOCUMENTS

| 2006/0271692 | A1 | 11/2006 | Kruse et al. | |
| 2006/0271697 | A1* | 11/2006 | Kruse | H04L 69/24 709/230 |
| 2010/0131665 | A1* | 5/2010 | Xiao | H04L 67/141 709/228 |
| 2014/0205565 | A1 | 7/2014 | Matheny | |
| 2017/0303332 | A1* | 10/2017 | Yuan | H04W 76/15 |

FOREIGN PATENT DOCUMENTS

JP 2006-333433 A 12/2006

* cited by examiner

*Primary Examiner* — Frantz Bataille
(74) *Attorney, Agent, or Firm* — Banner & Witcoff, Ltd.

(57) ABSTRACT

A communication device may send a first negotiation request including first version information to a first external device via a communication interface of the communication device, execute first communication with the first external device via the communication interface by using the predetermined communication protocol of a second version, send a second negotiation request including second version information to the first external device via the communication interface in a case where an error notification is received from the first external device in the first communication, and execute second communication with the first external device via the communication interface by using the predetermined communication protocol of the first version.

15 Claims, 15 Drawing Sheets

FIG. 2

| | Profile 1 | Profile 2 | Profile 3 | Profile 4 | Profile 5 |
|---|---|---|---|---|---|
| Network Folder Path | \\server1\shared11 | \\server2\shared21 | \\server3\shared31 | \\server4\shared41 | \\server5\shared51 |
| User Name | UUU1 | UUU1 | UUU1 | UUU1 | UUU1 |
| Password | PPP1 | PPP1 | PPP1 | PPP1 | PPP1 |
| SMB Version | - | - | - | SMB2.0 | SMB1.0 |

38

| User Name | Password | \\server1\shared11 | \\server1\shared12 |
|---|---|---|---|
| UUU1 | PPP1 | OK | NG |
| UUU2 | PPP2 | NG | OK |
| ... | ... | ... | ... |

110A

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

CROSS-REFERENCE TO RELATED APPLICATION

This application claims priority to Japanese Patent Application No. 2018-179278, filed on Sep. 25, 2018, the entire contents of which are hereby incorporated by reference into the present application.

TECHNICAL FIELD

The disclosure herein discloses a communication device configured to execute negotiation related to a version of a predetermined communication protocol with an external device.

BACKGROUND ART

A computing system environment provided with a client and a server is known. The client sends to the server a negotiation request including a version number of an SMB protocol supported by the client, and receives, from the server, a negotiation response including a version number of the SMB protocol to be used. The client communicates with the server according to the version number of the SMB protocol included in the negotiation response.

SUMMARY

Despite the negotiation for determining the version of the SMB protocol having been normally completed between the client and the server, the subsequent communication between the client and the server may not be normally executed.

The disclosure herein provides a technique enabling communication with an external device to be executed properly in a case where an error notification is received from the external device despite a negotiation having been normally executed.

A communication device disclosed herein may comprise a communication interface; a processor; and a memory storing computer-readable instructions therein, the computer-readable instructions, when executed by the processor, causing the communication device to: send a first negotiation request including first version information to a first external device via the communication interface, the first version information indicating that the communication device is capable of using a predetermined communication protocol of a plurality of versions, the plurality of versions including a first version and a second version newer than the first version; execute first communication with the first external device via the communication interface by using the predetermined communication protocol of the second version in a case where a first response to the first negotiation request is received from the first external device via the communication interface, the first response indicating that the first external device is capable of using the predetermined communication protocol of the second version; send a second negotiation request including second version information different from the first version information to the first external device via the communication interface in a case where an error notification is received from the first external device in the first communication, the second version information indicating that the communication device is capable of using the predetermined communication protocol of the first version; and execute second communication with the first external device via the communication interface by using the predetermined communication protocol of the first version in a case where a second response to the second negotiation request is received from the first external device via the communication interface, the second response indicating that the first external device is capable of using the predetermined communication protocol of the first version.

A control method, a computer program, and a computer-readable recording medium storing the computer program for realizing the above communication device are also novel and useful. Further, a communication system comprising the above communication device and first external device is also novel and useful.

BRIEF DESCRIPTION OF THE DRAWINGS

FIG. 2 shows examples of tables.

EMBODIMENTS (Embodiment)
(Configuration of Communication System 2; FIG. 1)
As shown in FIG. 1, a communication system 2 comprises a multi-function peripheral 10 (called "MFP" below), a PC 60, and a plurality of servers 100A to 100E. The MFP 10, the PC 60 and the servers 100A to 100E belong to the same LAN (abbreviation of Local Area Network) 4, and are capable of communicating with each other via the LAN 4.

(Configuration of MFP 10)

Figure 1:
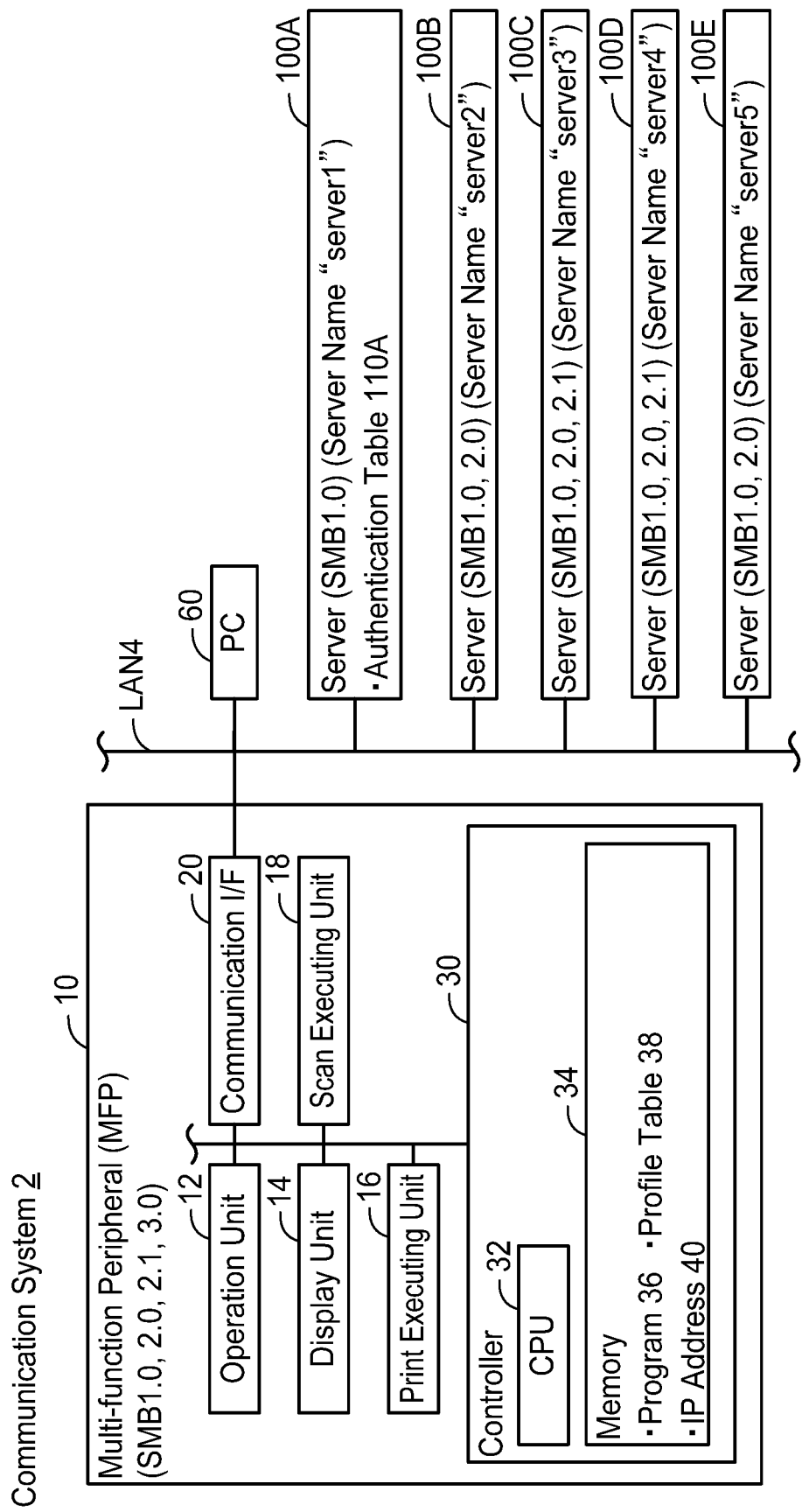
FIG. 1 shows a configuration of a communication system.

The MFP 10 is a peripheral device capable of executing multiple functions including a print function, a scan function and a web server function. The web server function is a function of sending web page data representing a web page to an external device in response to the external device accessing a web server of the MFP 10. The MFP 10 is capable of using SMB (abbreviation of Service Message Block), which is a file sharing protocol. The MFP 10 is capable of using especially SMB 1.0, SMB 2.0, SMB 2.1 and SMB 3.0. The values after "SMB" indicate versions of the SMB protocol, and the larger the value of version is, the newer the version is. The term "dialect" may be used to indicate a version of the SMB protocol.

The MFP 10 comprises an operation unit 12, a display unit 14, a print executing unit 16, a scan executing unit 18, a communication interface (interface will be termed "I/F" below) 20, and a controller 30.

The operation unit 12 comprises a plurality of keys. A user can input various instructions to the MFP 10 by operating the operation unit 12. The display unit 14 is a display for displaying various types of information. The display unit 14 also functions as a so-called touch panel (i.e., operation unit). The print executing unit 16 is a print mechanism of an ink jet scheme, laser scheme, or the like. The scan executing unit 18 is a scan mechanism of a CCD, CIS, or the like.

The controller 30 comprises a CPU 32 and a memory 34. The CPU 32 executes various processes in accordance with a program 36 stored in the memory 34. The memory 34 is constituted of a volatile memory, a non-volatile memory, and the like. The memory 34 stores a profile table 38 (see FIG. 2) and an IP address 40. The IP address 40 is an IP address assigned to the MFP 10.

(Configurations of Servers 100A to 100E)

The server 100A is a server that stores shared folders for file sharing. A server name "server1" is assigned to the server 100A. The server 100A is capable of using the SMB protocol, especially only SMB 1.0 (i.e., the server 100A is incapable of using a version newer than SMB 1.0). The server 100A stores an authentication table 110A (see FIG. 2).

The servers 100B to 100E have the same configuration as the server 100A, except that these servers are capable of using different versions of the SMB protocol. Server names "server2", "server3", "server4", and "server5" are assigned to the servers 100B, 100C, 100D, and 100E, respectively. The servers 100B, 100E are capable of using SMB 1.0 and SMB 2.0 (i.e., they are incapable of using a version newer than SMB 2.0), and the servers 100C, 100D are capable of using SMB 1.0, SMB 2.0 and SMB 2.1 (i.e., they are incapable of using a version newer than SMB 2.1). It should be noted that, in versions of the SMB protocol newer than 2.0, the SMB protocol can be interpreted variously. As a result, even programs corresponding to the same version of the SMB protocol may have different contents from each other depending on their vendors. In the present embodiment, the servers 100A to 100C are provided by the same vendor. The servers 100C, 100D, 100E are provided by different vendors, respectively. Then, a program corresponding to SMB 2.1 that is provided in the server 100C is consistent with a program corresponding to SMB 2.1 that is provided in the MFP 10. On the other hand, a program corresponding to SMB 2.1 that is provided in the server 100D is not consistent with the program corresponding to SMB 2.1 that is provided in the MFP 10. Further, programs corresponding to SMB 2.0 that are provided in the servers 100B, 100D are consistent with a program corresponding to SMB 2.0 that is provided in the MFP 10. On the other hand, a program corresponding to SMB 2.0 that is provided in the server 100E malfunctions or is not consistent with the program corresponding to SMB 2.0 that is provided in the MFP 10.

(Contents of Tables 38, 110A; FIG. 2)

Next, contents of the profile table 38 in the MFP 10 and the authentication table 110A in the server 100A will be described with reference to FIG. 2.

In the profile table 38 of the MFP 10, profile names (profiles 1 to 5) are each stored in association with corresponding profile information. Each of the profile information includes a network folder path, a user name, a password and an SMB version. Each profile name is a name for identifying its corresponding profile information and had been registered in advance by the time of shipping of the MFP 10. In a variant, the user may be allowed to newly create a profile name when registering a user name and a password in the profile table 38. Each network folder path is a path to a shared folder in a server. Each user name and password are information for identifying a user. Each SMB version is information indicating a version of the SMB protocol to be used in communication with a server. The profile table 38 is used when a scan_to_Network function is executed. This function is a function of storing scan data in a shared folder in a server.

The authentication table 110A of the server 100A is a table indicating whether access to shared folders in the server 100A is permitted or not. In the authentication table 110A, a user name, a password, access information to a shared folder "shared11", and access information to a shared folder "shared12" are stored in association with one another. Each of the access information includes one of a value "OK", which indicates that access to the shared folder is permitted, and a value "NG", which indicates that access to the shared folder is prohibited. The information in the authentication table 110A is set by an administrator of the server 100A. The servers 100B to 100E each store an authentication table similar to the authentication table 110A, as well.

(Specific Cases; FIG. 3 to FIG. 9)

Specific cases A to F realized by the communication system 2 of the present embodiment will be described with reference to FIG. 3 to FIG. 9.

Figure 3:
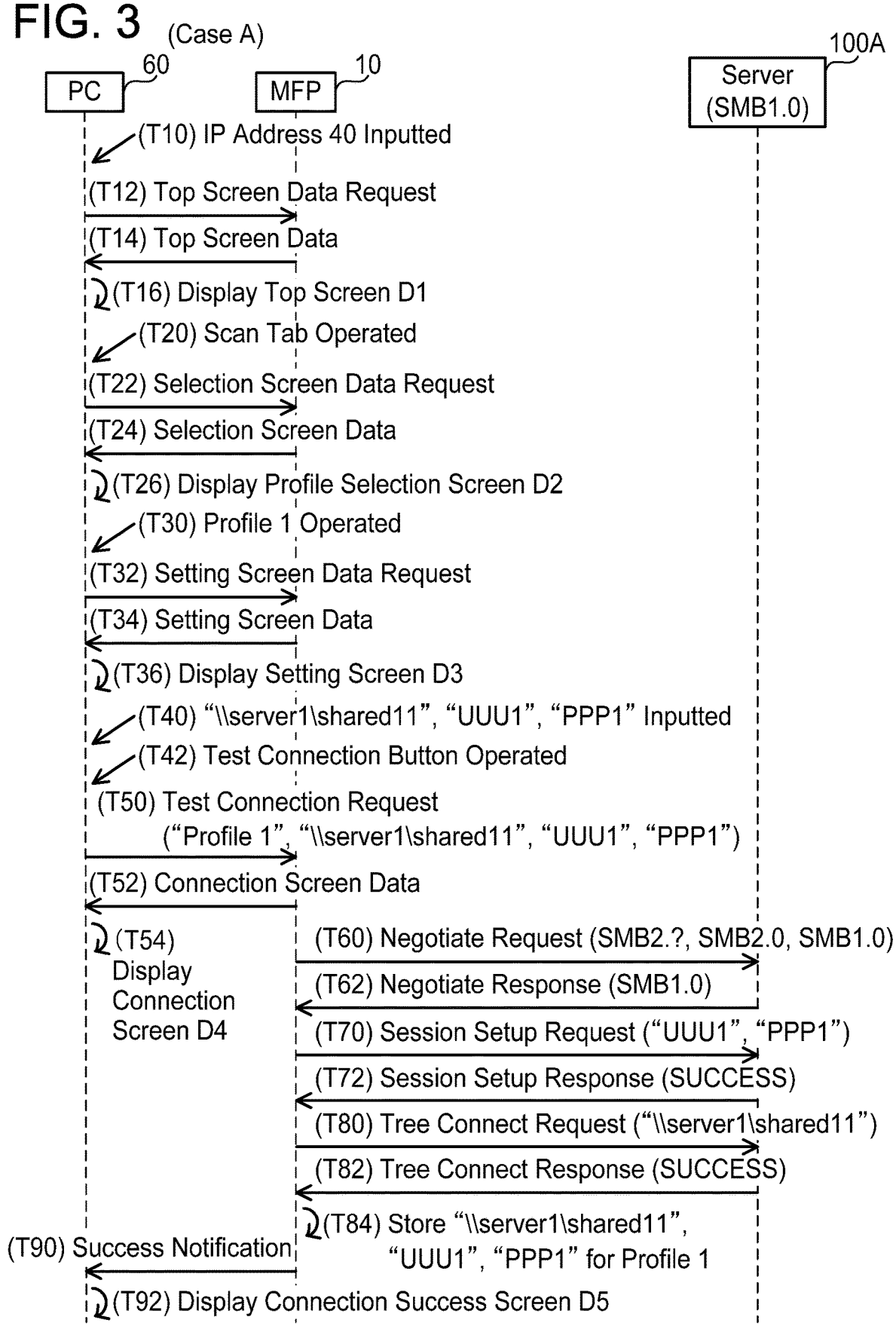
FIG. 3 shows a sequence diagram of case A in which communication using SMB 1.0 succeeds.

(Case A; FIG. 3)

Case A in which profile information is registered in association with the profile 1 in the profile table 38 (see FIG. 2) will be described with reference to FIG. 3. In case A, profile information for storing scan data in the shared folder "shared11" of the server 100A is registered. In an initial state of case A, no profile information has been registered yet in the profile table 38 of the MFP 10 (see FIG. 2), while a user name "UUU1" and a password "PPP1" have been already registered in the authentication table 110A of the server 100A (see FIG. 2) and "OK" has been set as the access information to the shared folder "shared11" for the user name "UUU1". All communication executed by the MFP 10 are executed via the communication I/F 20, thus the description "via the communication I/F 20" will be omitted hereinbelow.

Figure 12A:
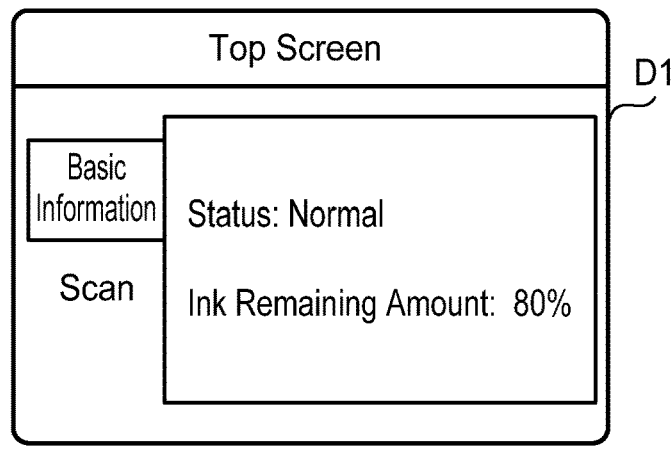
FIG. 12A shows an example of a top screen displayed on a PC.

Upon receiving an input of the IP address 40 of the MFP 10 in T10 under a state where a Web browser is activated, the PC 60 sends a top screen data request to the MFP 10 in T12, receives top screen data from the MFP 10 in T14, and displays a top screen D1 represented by the top screen data in T16. As shown in FIG. 12A, the screen D1 includes a basic information field and a scan tab. A current status and ink remaining amount of the MFP 10 are described in the basic information field.

Figure 12B:
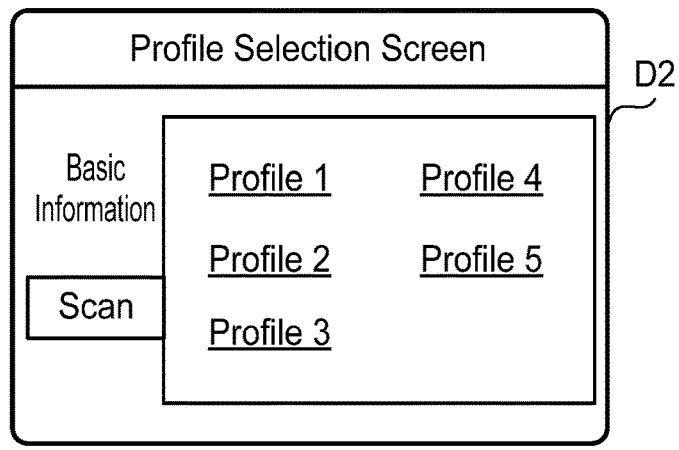
FIG. 12B shows an example of a profile selection screen displayed on the PC.

Upon the scan tab in the top screen D1 being operated in T20, the PC 60 sends a selection screen data request to the MFP 10 in T22, receives selection screen data from the MFP 10 in T24, and displays a profile selection screen D2 represented by the selection screen data in T26. As shown in FIG. 12B, the five profile names (i.e., the profiles 1 to 5) are described in the screen D2.

Figure 12C:
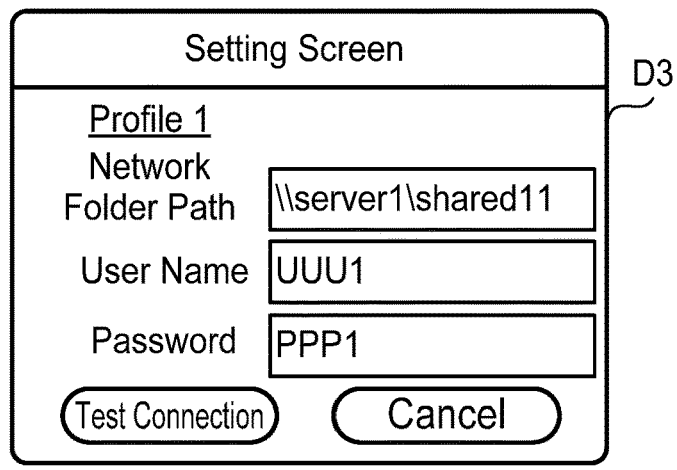
FIG. 12C shows an example of a setting screen displayed on the PC.

Upon accepting an operation of selecting the profile 1 in T30, the PC 60 sends a setting screen data request to the MFP 10 in T32, receives setting screen data from the MFP 10 in T34, and displays a setting screen D3 represented by the setting screen data in T36. As shown in FIG. 12C, the screen D3 includes the profile 1, a network folder path input field, a user name input field, a password input field, a test connection button, and a cancel button.

Upon a network folder path "\\server1\shared11", the user name "UUU1" and the password "PPP1" being inputted to the screen D3 in T40 and the test connection button being operated in the screen D3 in T42, the PC 60 sends a test connection request including "profile 1", "\\server1\shared11", "UUU1" and "PPP1" to the MFP 10 in T50.

Upon receiving the test connection request from the PC 60 in T50, the MFP 10 sends connection screen data to the PC 60 in T52.

Figure 12D:
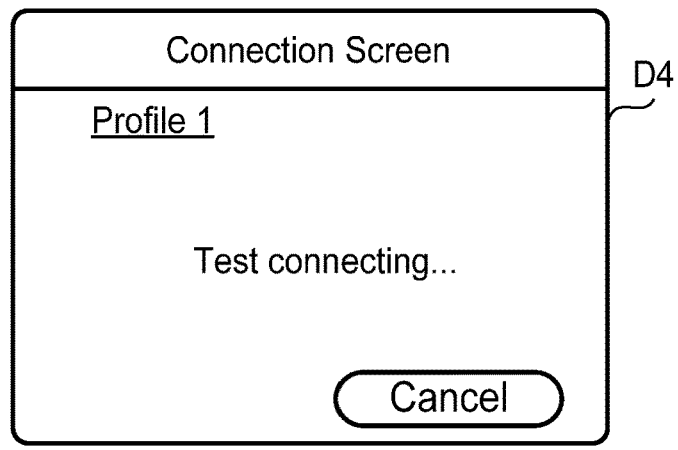
FIG. 12D shows an example of a connection screen displayed on the PC.

Upon receiving the connection screen data from the MFP 10 in T52, the PC 60 displays a connection screen D4 represented by the connection screen data in T54. As shown in FIG. 12D, the screen D4 includes the profile 1, a message indicating that a test connection is being executed, and a cancel button. Here, "test connection" is a process of confirming whether a shared folder in a server is accessible.

In T60, the MFP 10 sends a Negotiate request including version information to the server 100A. The Negotiate request is a request for negotiation to determine a version of the SMB protocol to be used in communication between the MFP 10 and the server 100A. The version information is information indicating versions of the SMB protocol that the MFP 10 is capable of using, and the version information sent in T60 includes "SMB 2.?", "SMB 2.0" and "SMB 1.0". "SMB 2.?" is information indicating that the version "SMB 2.1" or newer can be used.

Upon receiving the Negotiate request from the MFP 10 in T60, the server 100A determines a version of the SMB protocol to be used in communication with the MFP 10 by using the version information in the request. Since the server 100A is capable of using only "SMB 1.0" and "SMB 1.0" is included in the version information, the server 100A determines that "SMB 1.0" is to be used. Then, in T62, the server 100A sends a Negotiate response including "SMB 1.0" to the MFP 10.

In T62 the MFP 10 receives the Negotiate response from the server 100A. Since the Negotiate response includes "SMB 1.0", the MFP 10 determines "SMB 1.0" as the version of the SMB protocol to be used in subsequent communication with the server 100A. Next, in T70, the MFP 10 sends to the server 100A a Session Setup request including the user name "UUU1" and the password "PPP1" in the test connection request. The Session Setup request is a request for establishing a session with a server.

Upon receiving the Session Setup request from the MFP 10 in T70, the server 100A determines that the user name "UUU1" and the password "PPP1" in the request match the user name and the password registered in the authentication table 110A, and sends a Session Setup response including a status "SUCCESS" to the MFP 10 in T72.

Upon receiving the Session Setup response from the server 100A in T72, the MFP 10 determines that establishment of session with the server 100A has succeeded since the response includes the status "SUCCESS". Then, in T80, the MFP 10 sends to the server 100A a Tree Connect request including the network folder path "\\server1\shared11" in the test connection request. The Tree Connect request is a request for confirming whether access to a network folder path (i.e., shared folder) in this request is permitted.

Upon receiving the Tree Connect request from the MFP 10 in T80, the server 100A identifies that the access information of the network folder path "\\server1\shared11" associated with the user name "UUU1" in the authentication table 110A is "OK", and determines that access to the network folder path is permitted. Then, in T82, the server 100A sends a Tree Connect response including the status "SUCCESS" to the MFP 10.

Upon receiving the Tree Connect response from the server 100A in T82, the MFP 10 determines that the test connection has succeeded since the response includes the status "SUCCESS". Then, in T84, the MFP 10 stores profile information including the network folder path "\\server1\shared11", the user name "UUU1" and the password "PPP1" in association with the profile 1 in the profile table 38. Here, the MFP 10 does not store information for the SMB version of the profile 1. In T90, the MFP 10 sends a success notification indicating that the test connection succeeded to the PC 60.

Figure 12E:
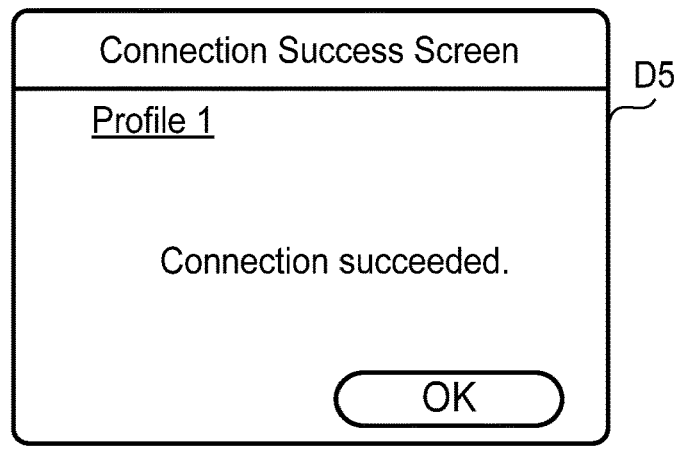
FIG. 12E shows an example of a connection success screen displayed on the PC.

Upon receiving the success notification in T90, the PC 60 displays a connection success screen D5 in T92. As shown in FIG. 12E, the screen D5 includes a message indicating that the test connection succeeded and an OK button. Thereby, the user of the PC 60 can be informed that the test connection to the server 100A has succeeded and that registration of the profile 1 has been completed. As a result, the scan_to_Network function using the profile 1 becomes available.

Figure 4:
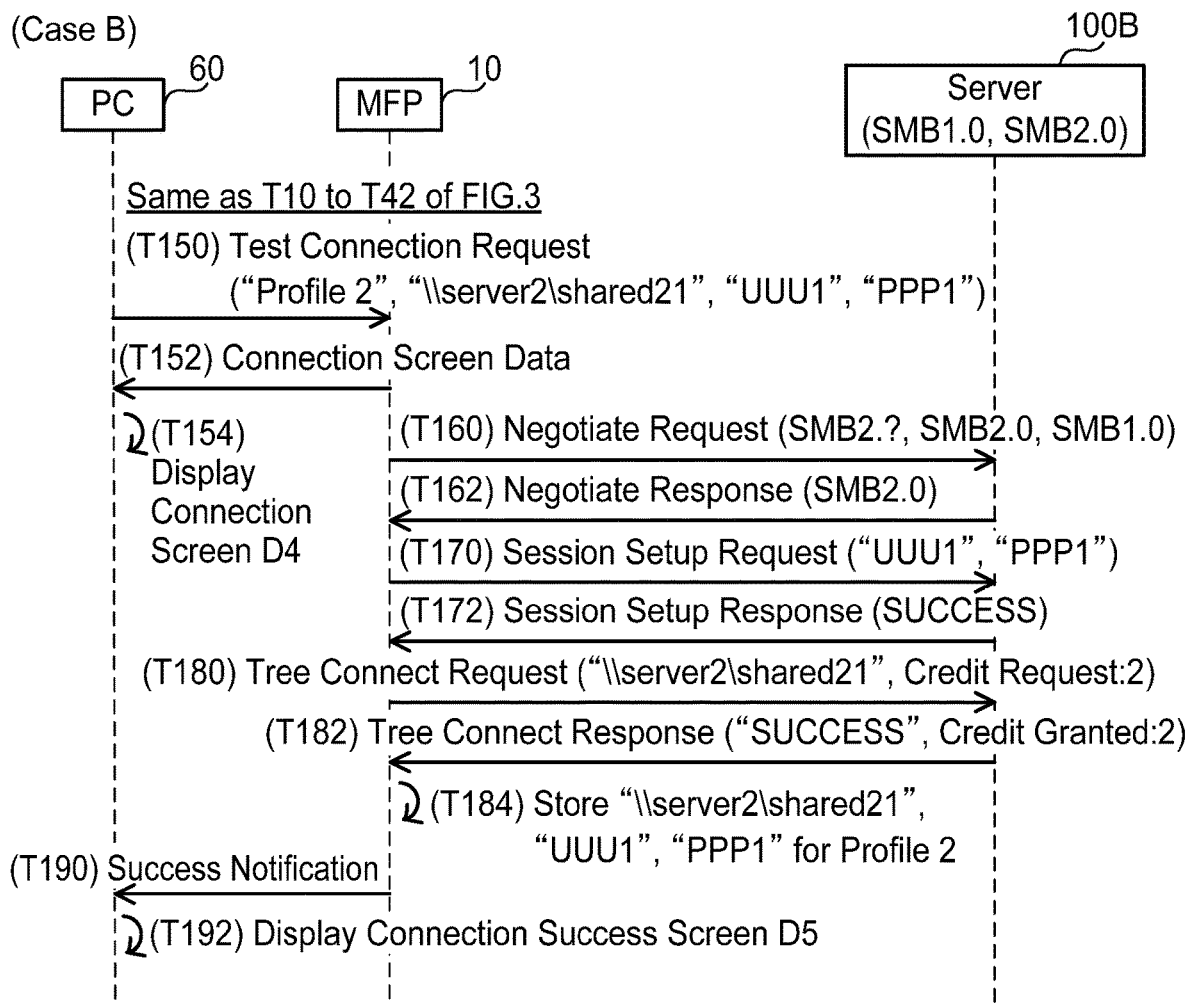
FIG. 4 shows a sequence diagram of case B in which communication using SMB 2.0 succeeds.

(Case B; FIG. 4)

Next, case B in which profile information is registered in association with the profile 2 in the profile table 38 (see FIG. 2) will be described with reference to FIG. 4. In case B, profile information for storing scan data in a shared folder "shared21" of the server 100B is registered. Case B is a state after case A, and thus the profile information has been registered for the profile 1 in the profile table 38 (see T84 of FIG. 3). Further, the user name "UUU1" and the password "PPP1" has already been registered in the authentication table in the server 100B, and "OK" has been set as the access information to the shared folder "shared21" for the user name "UUU1".

First, the same processes as T10 to T42 of FIG. 3 are executed between the PC 60 and the MFP 10. In the present case, the user of the PC 60 operates the profile 2 on the profile selection screen D2 (see FIG. 12B) and inputs a network folder path "\\server2\shared21", the user name "UUU1" and the password "PPP1" to the corresponding input fields on the setting screen D3 (see FIG. 12C).

In T150, the PC 60 sends a test connection request including "profile 2", "\\server2\shared21", "UUU1" and "PPP1" to the MFP 10. T152 and T154 are the same as T52 and T54 of FIG. 3, respectively. T160 is the same as T60 except that the communication target is the server 100B.

Upon receiving the Negotiate request from the MFP 10 in T160, the server 100B determines that "SMB 1.0" and "SMB 2.0" which the server 100B is capable of using are included in the version information of that request. Next, the server 100B determines to use the newest version "SMB 2.0" from among "SMB 1.0" and "SMB 2.0" which the server 100B is capable of using. Then, in T162, the server 100B sends a Negotiate response including "SMB 2.0" to the MFP 10. T170 and T172 are the same as T70 and T72 of FIG. 3, respectively, except that the communication target is the server 100B.

In T180, the MFP 10 sends to the server 100B a Tree Connect request including the network folder path "\\server2\shared21" and a Credit Request number "2". The Credit Request number is information indicating the number of Credits which a device operating as a client (e.g., the MFP 10) requests to a device operating as a server (e.g., the server 100B) in communication using the SMB protocol. The device operating as a client receives a Credit Granted number from the device operating as a server in response to sending the Credit Request number. The device operating as a client can simultaneously send, to the device operating as a server, as many request signals as the received Credit Granted number. In the present embodiment, the MFP 10 sends the predetermined Credit Request number "2".

Upon receiving the Tree Connect request from the MFP 10 in T180, the server 100B identifies that the access information of the network folder path "\\server2\shared21" associated with the user name "UUU1" in the authentication table of the server 100B is "OK", and determines that access to this network folder path is permitted. Further, the server 100B identifies "2" as the Credit Granted number. Then, in T182, the server 100B sends a Tree Connect response including the status "SUCCESS" and the Credit Granted number "2" to the MFP 10.

In T184, the MFP 10 stores profile information including the network folder path "\\server2\shared21", the user name "UUU1" and the password "PPP1" in association with the profile 2 in the profile table 38. Here, the MFP 10 does not store information for the SMB version of the profile 2. T190 and T192 are the same as T90 and T92 of FIG. 3, respectively. Thereby, the scan_to_Network function using the profile 2 becomes available.

Figure 5:
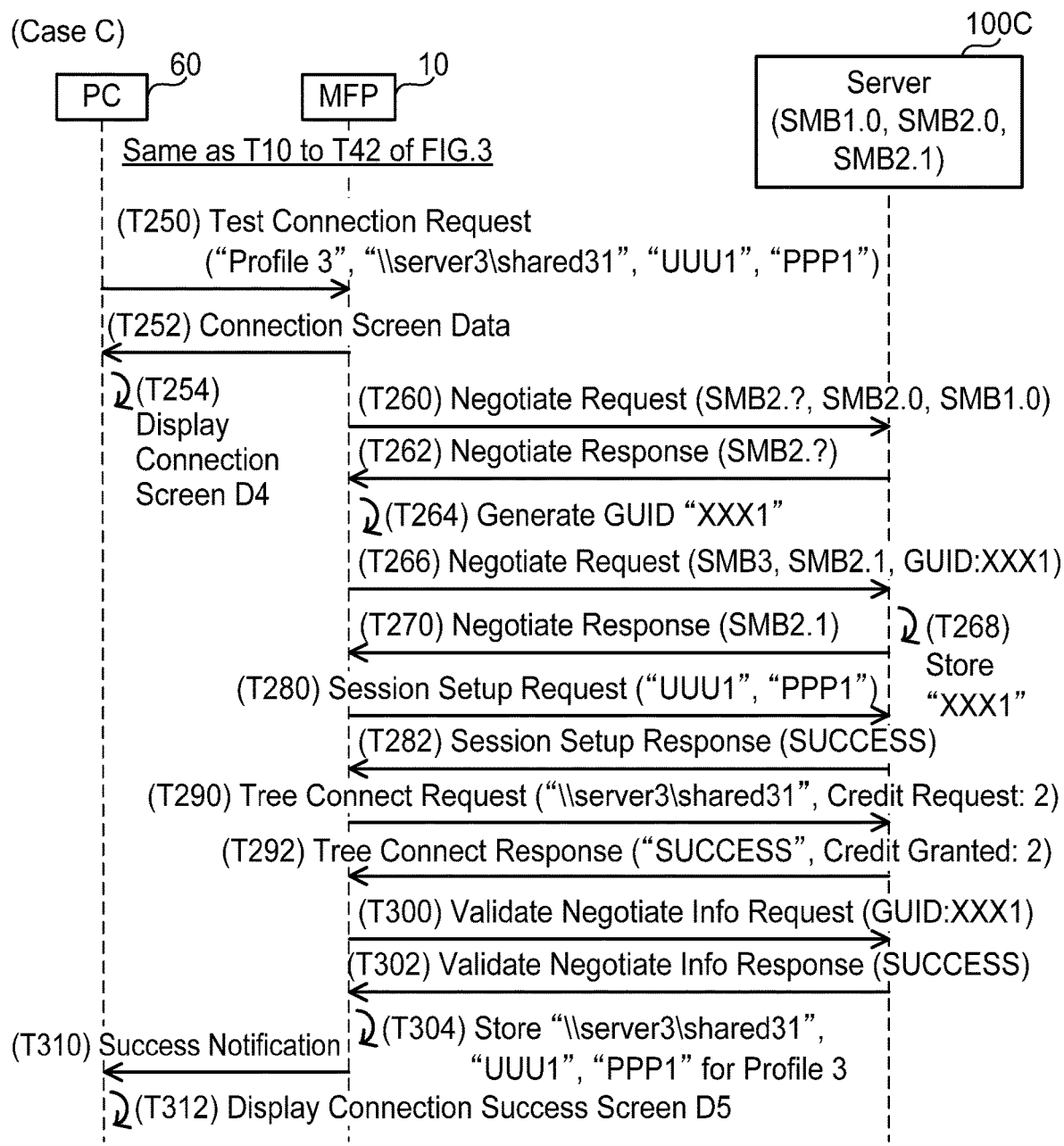
FIG. 5 shows a sequence diagram of case C in which communication using SMB 2.1 succeeds.

(Case C; FIG. 5)

Next, case C in which profile information is registered in association with the profile 3 in the profile table 38 (see FIG. 2) will be described with reference to FIG. 5. In case C, profile information for storing scan data in a shared folder "shared31" of the server 100C is registered. Case C is a state after case B, and thus the profile information has been registered for each of the profiles 1 and 2 in the profile table 38 (see T184 of FIG. 4). Further, the user name "UUU1" and the password "PPP1" have already been registered in the authentication table in the server 100C, and "OK" has been set as the access information to the shared folder "shared31" for the user name "UUU1".

First, the same processes as T10 to T42 of FIG. 3 are executed between the PC 60 and the MFP 10. In the present case, the user of the PC 60 operates the profile 3 on the profile selection screen D2 (see FIG. 12B), and inputs a network folder path "\\server3\shared31", the user name "UUU1" and the password "PPP1" to the corresponding input fields on the setting screen D3 (see FIG. 12C).

In T250, the PC 60 sends a test connection request including "profile 3", "\\server3\shared31", "UUU1" and "PPP1" to the MFP 10. T252 and T254 are the same as T52 and T54 of FIG. 3, respectively. T260 is the same as T60 except that the communication target is the server 100C.

Upon receiving the Negotiate request from the MFP 10 in T260, the server 100C determines that "SMB 1.0", "SMB 2.0" and "SMB 2.1" which the server 100C is capable of using are included in the version information of that request. Next, the server 100C determines to use the newest version "SMB 2.1" from among "SMB 1.0", "SMB 2.0" and "SMB 2.1" which the server 100C is capable of using. Then, in T262, the server 100C sends, to the MFP 10, a Negotiate response including "SMB 2.?" corresponding to "SMB 2.1".

Upon receiving the Negotiate response from the server 100C in T262, the MFP 10 determines that communication using version SMB 2.1 or newer is desired because the response includes "SMB 2.?". In this case, from among "SMB 1.0", "SMB 2.0", "SMB 2.1" and "SMB 3.0" which the MFP 10 is capable of using, the MFP 10 identifies versions of "SMB 2.1" or newer (i.e., "SMB 2.1" and "SMB 3.0"). Next, in T264, the MFP 10 generates a GUID (abbreviation of Globally Unique Identifier) "XXX1". The GUID is a random character string for identifying the MFP 10 and is information that is generated when communication using "SMB 2.1" or a version newer than "SMB 2.1" is executed for the first time after a power of the MFP 10 has been turned on. In a variant, the GUID may be generated when the power of the MFP 10 is turned on. Then, in T266, the MFP 10 sends, to the server 100C, a Negotiate request that includes version information including the identified "SMB 2.1" and "SMB 3.0" and the generated GUID "XXX1".

Upon receiving the Negotiate request from the MFP 10 in T266, the server 100C stores the GUID "XXX1" in this request in T268. Then, the server 100C determines that "SMB 2.1" which the server 100C is capable of using is included in the version information of this request and determines to use "SMB 2.1". Next, in T270, the server 100C sends a Negotiate response including "SMB 2.1" to the MFP 10. T280 to T292 are the same as T170 to T182 of FIG. 4 except that the communication target is the server 100C.

Upon receiving the Tree Connect response including the status "SUCCESS" from the server 100C in T292, the MFP 10 sends in T300, to the server 100C, a Validate Negotiate Info request including the GUID "XXX1" generated in T264. The Validate Negotiate Info request is a signal communicated in "SMB 2.1" and newer versions, and is a signal for verifying whether the sender of the Negotiate request is the same as the sender of the Validate Negotiate Info request.

Upon receiving the Validate Negotiate Info request from the MFP 10 in T300, the server 100C determines that the GUID "XXX1" in this request matches the GUID "XXX1" stored in T268, and thus determines that the sender of the Negotiate request is the same as the sender of the Validate Negotiate Info request. Then, in T302, the server 100C sends a Validate Negotiate Info response including the status "SUCCESS" to the MFP 10.

Upon receiving the Validate Negotiate Info response from the server 100C in T302, the MFP 10 determines that the verification by the server 100C has succeeded because this request includes the status "SUCCESS". Then, in T304, the MFP 10 stores profile information including the network folder path "\\server3\shared31", the user name "UUU1" and the password "PPP1" in association with the profile 3 in the profile table 38. Here, the MFP 10 does not store information for the SMB version of the profile 3. T310 and T312 are the same as T90 and T92 of FIG. 3, respectively.

Figure 6:
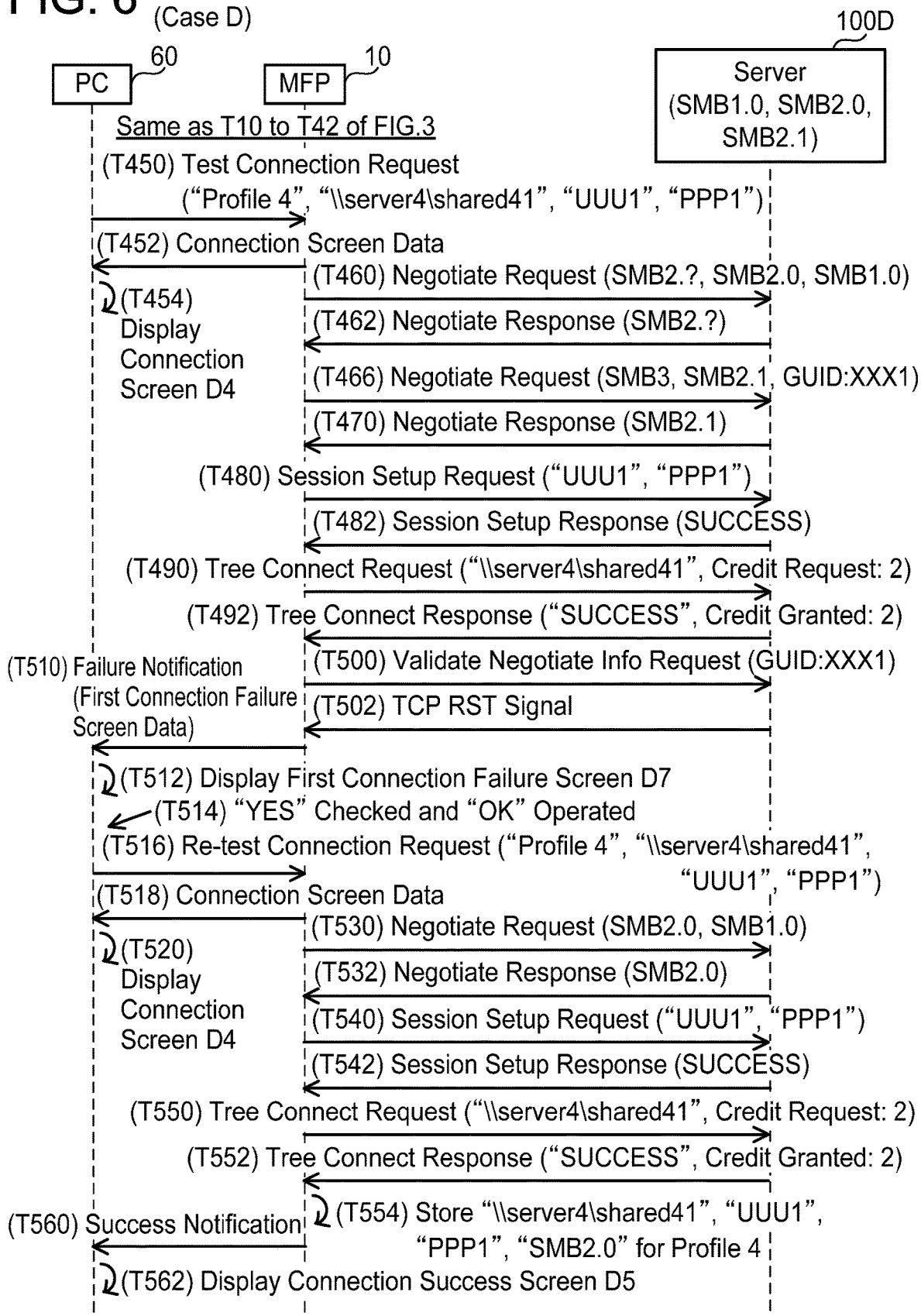
FIG. 6 shows a sequence diagram of case D in which communication using SMB 2.1 fails.

(Case D; FIG. 6)

Next, case D in which profile information is registered in association with the profile 4 in the profile table 38 (see FIG. 2) will be described with reference to FIG. 6. In case D, profile information for storing scan data in a shared folder "shared41" of the server 100D is registered. Case D is a state after case C, and thus the profile information has been registered for each of the profiles 1 to 3 in the profile table 38 (see T304 of FIG. 5). Further, the user name "UUU1" and the password "PPP1" have been already registered in the authentication table in the server 100D, and "OK" has been set as the access information to the shared folder "shared41" for the user name "UUU1". Further, the MFP 10 has already generated the GUID "XXX1" (see T264 of FIG. 5).

First, the same processes as T10 to T42 of FIG. 3 are executed between the PC 60 and the MFP 10. In the present case, the user of the PC 60 operates the profile 4 on the profile selection screen D2 (see FIG. 12B) and inputs a network folder path "\\server4\shared41", the user name "UUU1" and the password "PPP1" to the corresponding input fields on the setting screen D3 (see FIG. 12C).

In T450, the PC 60 sends a test connection request including "profile 4", "\\server4\shared41", "UUU1" and "PPP1" to the MFP 10. T452 and T454 are the same as T252 and T254 of FIG. 5, respectively. T460, T462, and T466 are the same as T260, T262, and T266, respectively, except that the communication target is the server 100D.

Since the server 100D is provided by a vendor different from the vendor of the MFP 10, the server 100D is not provided with a program for using GUID despite being capable of using "SMB 2.1". Therefore, even when the server 100D receives the Negotiate request including the GUID "XXX1" from the MFP 10 in T466, the server 100D does not store the GUID, and the server 100D sends a Negotiate response including "SMB 2.1" to the MFP 10 in T470.

T480 to T500 are the same as T280 to T300 of FIG. 5 except that the communication target is the server 100D. As described above, the server 100D is not provided with a program for using GUID. Therefore, even when the server 100D receives a Validate Negotiate Info request from the MFP 10 in T500, the server 100D cannot interpret this request. In this case, in T502, the server 100D sends a TCP RST signal to the MFP 10. This TCP RST signal is a signal for requesting disconnection of the session with the MFP 10 and indicates that the server 100D cannot interpret the Validate Negotiate Info request. Here, the Negotiate request, the Negotiate response, the Session Setup request, the Session Setup response, the Tree Connect request, the Tree Connect response, the Validate Negotiate Info request and the Validate Negotiate Info response are signals communicated by using an application layer of the OSI model, and the TCP RST signal is a signal communicated by using a transport layer that is a layer lower than the application layer.

Upon receiving the TCP RST signal from the server 100D in T502, the MFP 10 determines that the test connection with the server 100D using "SMB 2.1" has failed, and sends a failure notification including first connection failure screen data to the PC 60 in T510.

Figure 13A:
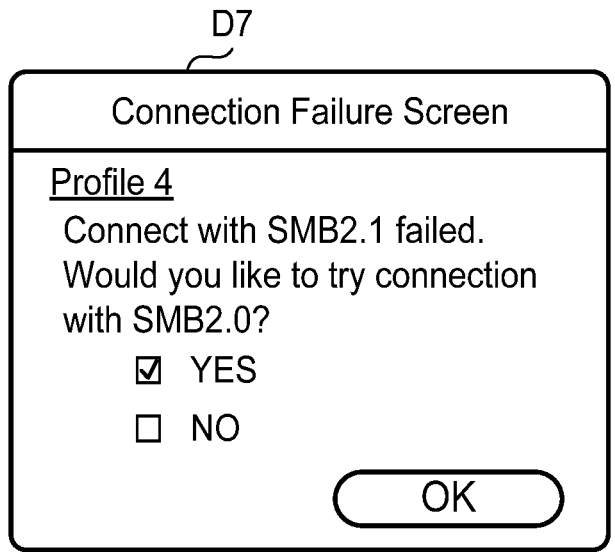
FIG. 13A shows an example of a first connection failure screen displayed on the PC.

Upon receiving the failure notification from the MFP 10 in T510, the PC 60 displays in T512 a first connection failure screen D7 represented by the first connection failure screen data in that notification. As shown in FIG. 13A, the screen D7 includes a message indicating that the test connection using "SMB 2.1" has failed, a message enquiring whether to attempt a test connection using "SMB 2.0" which is an older version than "SMB 2.1", two check boxes corresponding to "Yes" and "No", and an OK button. Therefore, the user can select whether to cause the MFP 10 to execute a test connection using the older version of the SMB protocol. Upon accepting a check in the check box corresponding to "Yes" and an operation on the OK button in T514, the PC 60 sends a re-test connection request including "profile 4", "\\server4\shared41", "UUU1" and "PPP1" to the MFP 10 in T516. T518 and T520 are the same as T452 and T454, respectively.

Upon receiving the re-test connection request from the PC 60 in T516, the MFP 10 determines that a second test connection using "SMB 2.0", which is an older version than "SMB 2.1" with which the first test connection failed, is being requested, and sends a Negotiate request including "SMB 2.0" and "SMB 1.0" to the server 100D in T530. That is, although the MFP 10 can use "SMB 2.1", the Negotiate request sent in T530 does not include "SMB 2.?" corresponding to "SMB 2.1" with which the first test connection failed. Therefore, it is possible to prevent execution of communication using "SMB 2.1" in the second test connection, thus the possibility that the test connection repeatedly fails can be decreased.

Upon receiving the Negotiate request from the MFP 10 in T530, the server 100D determines to use "SMB 2.0", and sends a Negotiate response including "SMB 2.0" to the MFP 10 in T532. T540 to T562 are the same as T170 to T192 of FIG. 4 except for that the communication target is the server 100D. In T554, the MFP 10 registers profile information including the network folder path "\\server4\shared41", the user name "UUU1", the password "PPP1" and "SMB 2.0" in association with the profile 4 in the profile table 38. That is, "SMB 2.0" is registered as the SMB version in the profile table 38.

Figure 7:
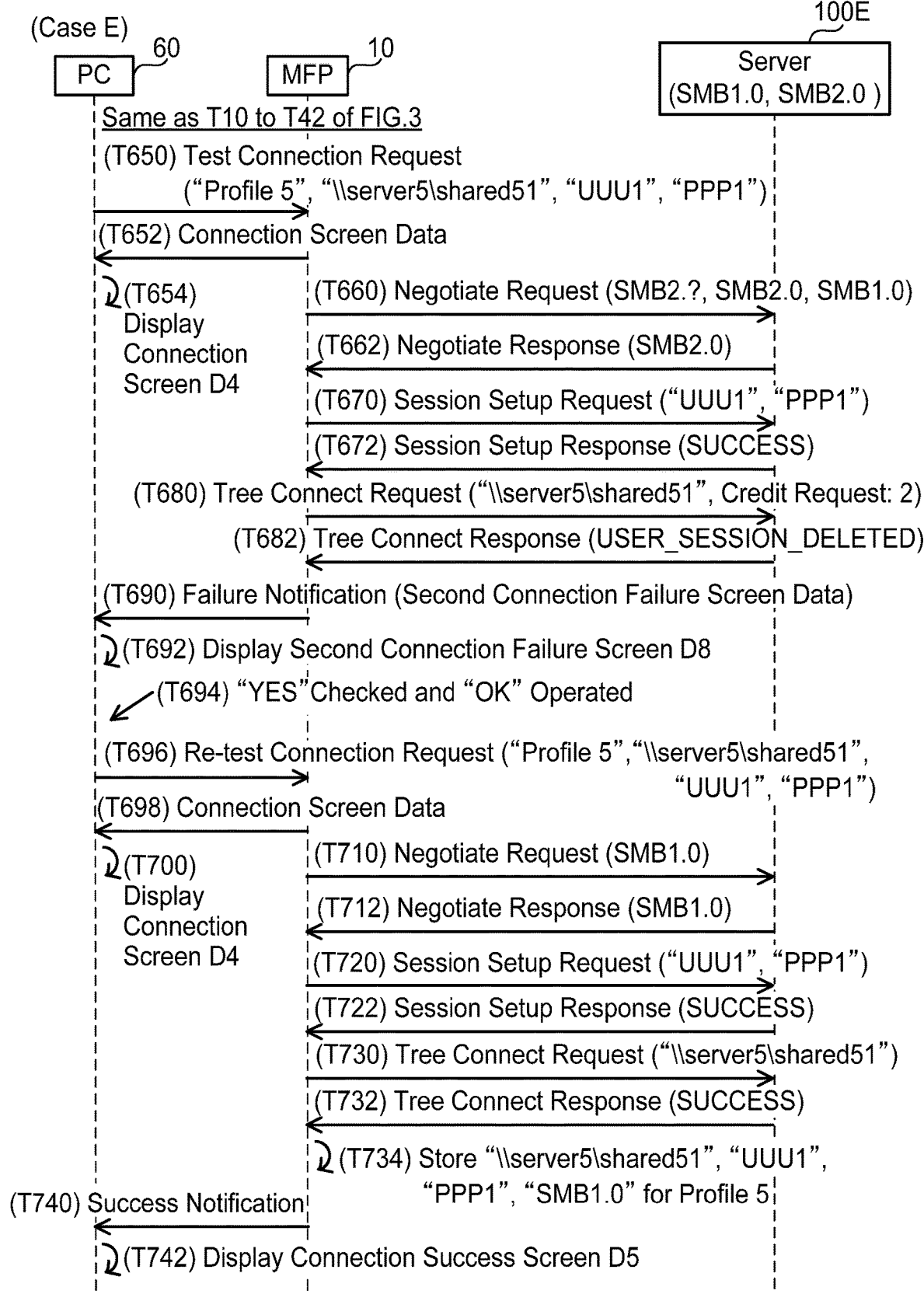
FIG. 7 shows a sequence diagram of case E in which communication using SMB 2.0 fails.

(Case E; FIG. 7)

Next, case E in which profile information is registered in association with the profile 5 in the profile table 38 will be described with reference to FIG. 7. In case E, profile information for storing scan data in a shared folder "shared51" of the server 100E is registered. Case E is a state after case D, and thus profile information has been registered for each of the profiles 1 to 4 in the profile table 38 (see T554 of FIG. 6). Further, the user name "UUU1" and the password "PPP1" have already been registered in the authentication table in the server 100E, and "OK" has been set as the access information to the shared folder "shared51" for the user name "UUU1".

First, the same processes as T10 to T42 of FIG. 3 are executed between the PC 60 and the MFP 10. In the present case, the user of the PC 60 operates the profile 5 on the profile selection screen D2 (see FIG. 12B) and inputs a network folder path "\\server5\shared51", the user name "UUU1" and the password "PPP1" to the corresponding input fields on the setting screen D3 (see FIG. 12C).

In T650, the PC 60 sends a test connection request including "profile 5", "\\server5\shared51", "UUU1" and "PPP1" to the MFP 10. T652 to T680 are the same as T152 to T180 of FIG. 4 except that the communication target is the server 100E.

Upon receiving the Tree Connect request from the MFP 10 in T680, the server 100E sends a Tree Connect response including a status "USER_SESSION_DELETED" to the MFP 10 in T682, despite the session with the MFP 10 having been successfully established in T670 and T672. This status is information indicating that the session between the MFP 10 and the server 100E has been disconnected. Reasons why such a Tree Connect response is sent from the server 100E may include, for example: that the program provided in the server 100E is malfunctioning, that the program provided in the MFP 10 is not consistent with the program provided in the server 100E, that the Credit Request number in the Tree Connect request is greater than an upper limit of Credit number acceptable by the server 100E, and the like.

Upon receiving the Tree Connect response from the server 100E in T682, the MFP 10 determines that the test connection with the server 100E using "SMB 2.0" has failed because that response includes the status "USER_SESSION_DELETED", and sends a failure notification including second connection failure screen data to the PC 60 in T690.

Figure 13B:
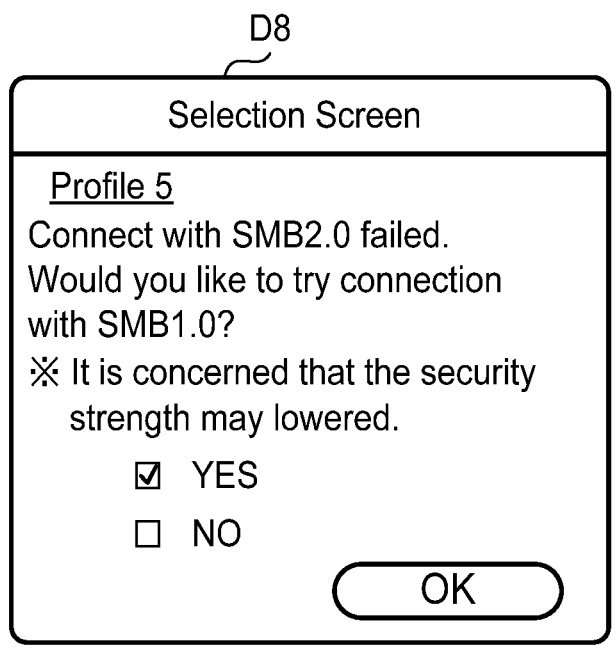
FIG. 13B shows an example of a second connection failure screen displayed on the PC.

Upon receiving the failure notification from the MFP 10 in T690, the PC 60 displays in T692 a second connection failure screen D8 represented by the second connection failure screen data in that notification. As shown in FIG. 13B, the screen D8 includes a message indicating that the test connection using "SMB 2.0" has failed, a message enquiring whether to attempt a test connection using "SMB 1.0" which is an older version than "SMB 2.0", a message indicating that it is concerned security strength may be lowered, two check boxes corresponding to "Yes" and "No", and an OK button. Unlike the first connection failure screen D7 shown in FIG. 13A, the second connection failure screen D8 includes the message indicating that it is concerned security strength may be lowered. Therefore, the user can be informed that using "SMB 1.0" lowers security strength. In a variant, the first connection failure screen D7 may also include the message indicating that it is concerned security strength may be lowered. Upon accepting a check in the check box corresponding to "Yes" and an operation on the OK button in T694, the PC 60 sends a re-test connection request including "profile 5", "\\server5\shared51", "UUU1", "PPP1" and "SMB 1.0" to the MFP 10 in T696. T698 and T700 are the same as T652 and T654, respectively.

Upon receiving the re-test connection request from the PC 60 in T696, the MFP 10 determines that a second test connection using "SMB 1.0", which is an older version than "SMB 2.0" with which the first test connection failed, is being requested, and sends a Negotiate request including "SMB 1.0" to the server 100E in T710. That is, although the MFP 10 can use "SMB 2.0", "SMB 2.1" and "SMB 3.0", the Negotiate request sent in T710 does not include "SMB 2.0" with which the first test connection failed nor the newer "SMB 2.?". Therefore, it is possible to prevent execution of communication using "SMB 2.0" in the second test connection, thus the possibility that the test connection fails can be decreased.

Upon receiving the Negotiate request from the MFP 10 in T710, the server 100E determines to use "SMB 1.0" and sends a Negotiate response including "SMB 1.0" to the MFP 10 in T712. T720 to T742 are the same as T70 to T92 of FIG. 3 except that the communication target is the server 100E. In T734, the MFP 10 registers profile information including the network folder path "\\server5\shared51", the user name "UUU1", the password "PPP1" and "SMB 1.0" in association with the profile 5 in the profile table 38.

Figure 8:
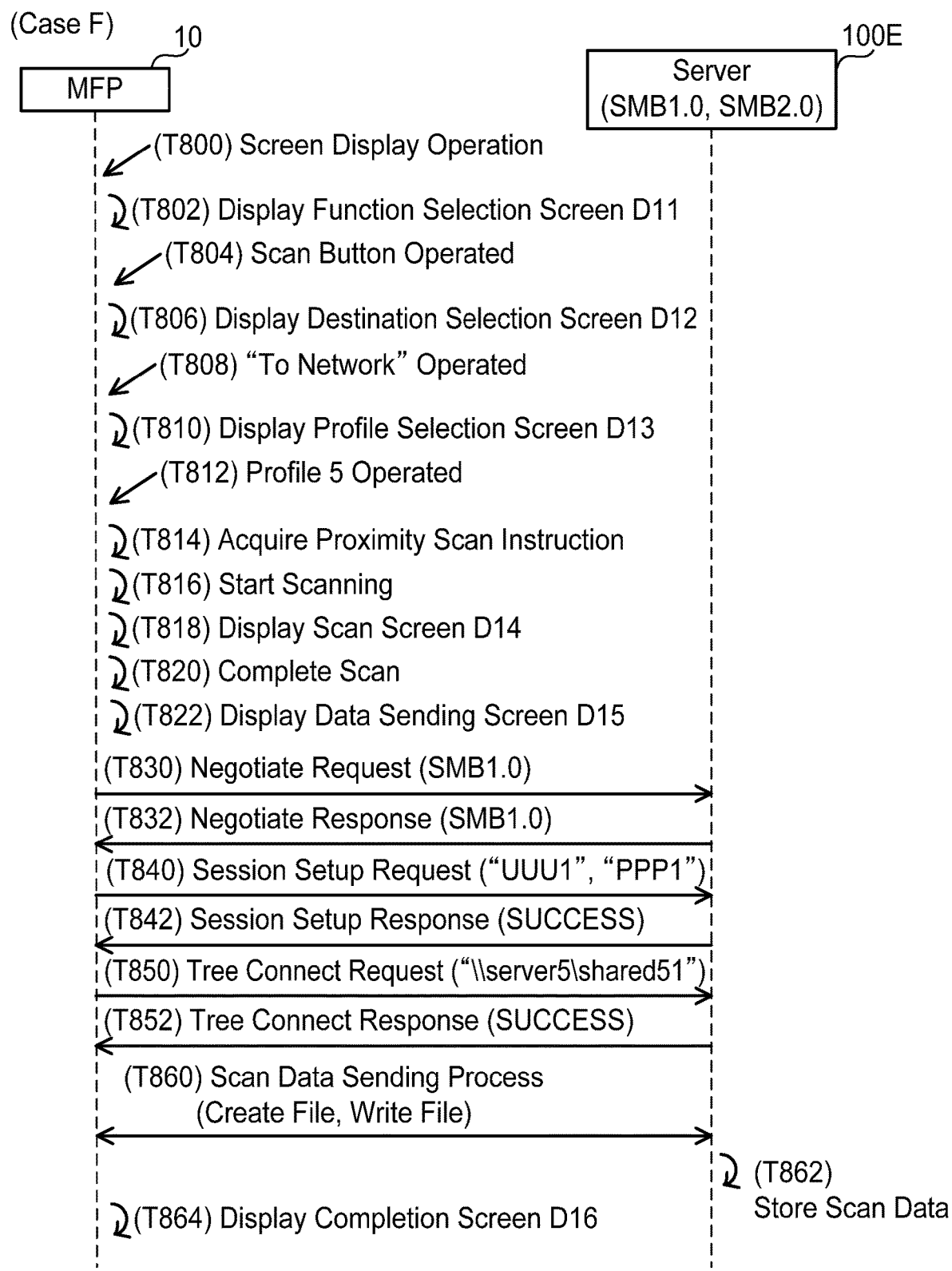
FIG. 8 shows a sequence diagram of case F in which communication of scan data using SMB 1.0 is executed.

(Case F; FIG. 8)

Next, case F in which the MFP 10 executes the scan_to_Network function will be described with reference to FIG. 8. Case F is a state after case E, and thus the profile information has been registered for each of the profiles 1 to 5 (see T734 of FIG. 7) in the profile table 38 of the MFP 10 (see FIG. 2).

Figure 14:
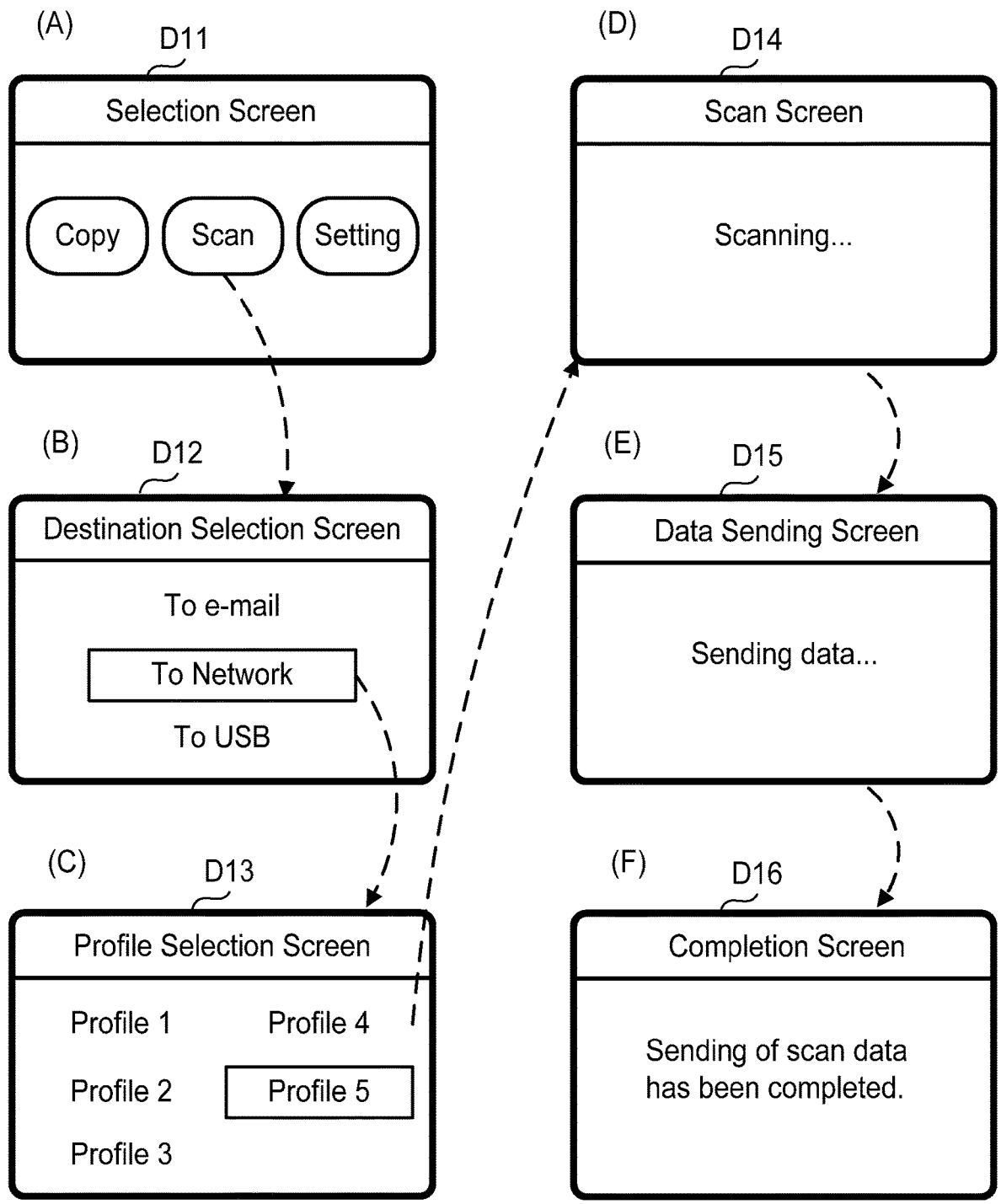
FIG. 14 shows examples of screens displayed on an MFP.

Upon accepting a screen display operation through the operation unit 12 in T800, the MFP 10 displays a function selection screen D11 in T802. As shown in FIG. 14(A), the screen D11 includes a Copy button, a Scan button, and a setting button. The Copy button is a button for selecting use of the copy function, the Scan button is a button for selecting use of the scan function, and the setting button is a button for executing a network setting or the like of the MFP 10.

Upon accepting an operation on the Scan button in T804, the MFP 10 displays a destination selection screen D12 in T806. As shown in FIG. 14(B), the screen D12 includes a "To e-mail" button, a "To Network" button, and a "To USB" button. The "To e-mail" button is a button for selecting to send an e-mail to which scan data is attached. The "To Network" button is a button for selecting to send scan data to a server on a network, i.e., is also a button for selecting to execute the scan_to_Network function. The "To USB" button is a button for sending scan data to a USB.

Upon accepting an operation on the "To Network" button in T808, the MFP 10 displays a profile selection screen D13 in T810. As shown in FIG. 14(C), the screen D13 includes the profiles 1 to 5 for which the profile information has already been registered. Upon accepting an operation on the profile 5 in T812, the MFP 10 acquires a proximity scan instruction including the profile 5 in T814, starts scanning a document set on the MFP 10 in T816, and displays a scan screen D14 in T818. As shown in FIG. 14(D), the screen D14 includes a message indicating that the document is being scanned. Upon generation of scan data being completed in T820, the MFP 10 displays a data sending screen D15 in T822. As shown in FIG. 14(E), the screen D15 includes a message indicating that the scan data is being sent.

The MFP 10 identifies that "SMB 1.0" is stored as the SMB version of the profile 5 in the profile table 38 and that the network folder path of the profile 5 includes the server name "server5" of the server 100E. Then, in T830, the MFP 10 sends, to the identified server 100E, a Negotiate request that includes only the identified SMB "1.0" without including SMB "2.?" nor "SMB 2.0". Subsequent T832 to T852 are the same as T712 to T732 of FIG. 7. Thereby, the MFP 10 becomes to be able to send the scan data to the server 100E.

In T860, a scan data sending process is executed between the MFP 10 and the server 100E, and the scan data is sent from the MFP 10 to the server 100E. From a standpoint of the MFP 10, the scan data sending process includes sending a Create File request, receiving a response thereto, sending a Write File request, and receiving a response thereto. Thereby, the server 100E receives the scan data, and stores the scan data in the shared folder "shared51" in T862.

Upon completion of the scan data sending process with the server 100E, the MFP 10 displays a completion screen D16 in T864. As shown in FIG. 14(F), the screen D16 includes a message indicating that the sending of the scan data to the server 100E has been completed. Thereby, the user can be informed that the scan data has been stored in the shared folder "shared51" in the server 100E. Thereafter, the user can use the scan data by accessing the folder "shared51" by using the PC 60, for example.

If "SMB 1.0" is not stored in T734 of FIG. 7, the MFP 10 sends in T830, to the server 100E, a Negotiate request including "SMB 2.?", "SMB 2.0" and "SMB 1.0" as the version information. In this case, communication using "SMB 2.0" is executed between the MFP 10 and the server 100E (T670 to T682). That is, since the MFP 10 receives the Tree Connect response including the status "USER_SESSION_DELETED" from the server 100E, the MFP 10 cannot access the shared folder "shared51" and thus does not send the scan data to the server 100E. On the other hand, in the present embodiment, "SMB 1.0" is stored in T734 of FIG. 7. In this case, the MFP 10 sends the Negotiate request including only "SMB 1.0" to the server 100E in T830. Therefore, communication using "SMB 1.0" is executed between the MFP 10 and the server 100E (T840 to T852).

Consequently, the MFP 10 can access the shared folder "shared51" of the server 100E and send the scan data to the server 100E. As a result, the scan data is stored in the shared folder "shared51" of the server 100E. As above, by storing the version of the SMB protocol in the profile table 38, the MFP 10 can appropriately execute communication with the server 100E.

Further, if the profile 4 is operated in T812, the MFP 10 acquires a proximity scan instruction including the profile 4, identifies that "SMB 2.0" is stored as the SMB version of the profile 4 in the profile table 38, and sends a Negotiate request including only the identified "SMB 2.0" to the server 100D. Thereafter, the same processes as T532 to T552 of FIG. 6 and T860 of FIG. 8 are executed between the MFP 10 and the server 100D, and the scan data is stored in the shared folder "shared41" in the server 100D. As above, the MFP 10 can appropriately store the scan data in the shared folders by using the versions of the SMB protocol suitable for the servers 100D, 100E.

Figure 9:
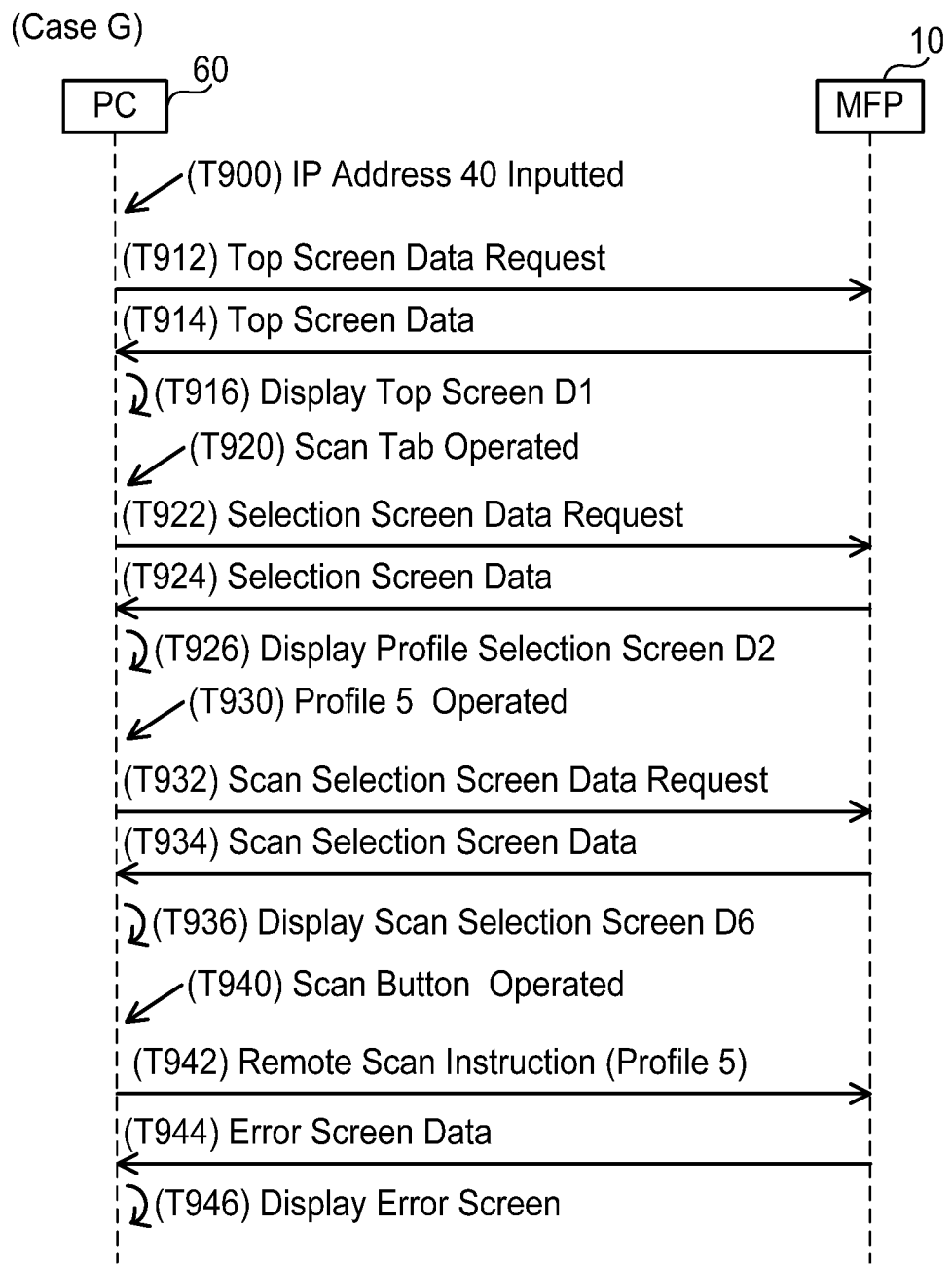
FIG. 9 shows a sequence diagram of case G in which communication of scan data is restricted.

(Case G; FIG. 9)

Next, a case G in which execution of the scan_to_Network function is requested by the web server of the MFP 10 being accessed will be described with reference to FIG. 9. An initial state of FIG. 9 is the same as the initial state of FIG. 8.

Figure 12F:
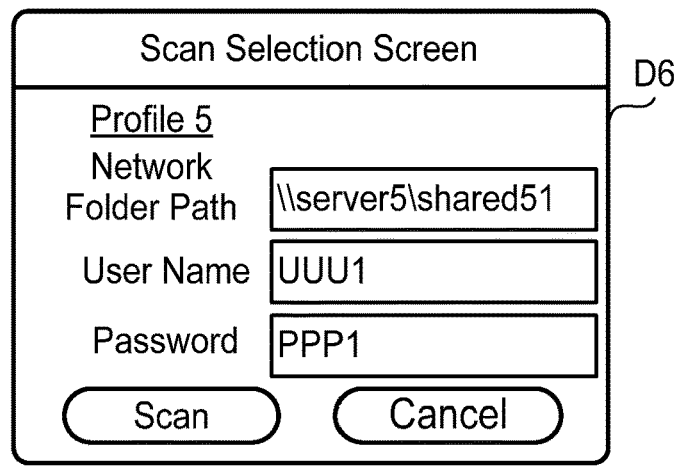
FIG. 12F shows an example of a scan selection screen displayed on the PC.

T900 to T926 are the same as T10 to T26 of FIG. 3. Upon accepting an operation on the profile 5 in T930, the PC 60 sends a scan selection screen data request to the MFP 10 in T932, receives scan selection screen data from the MFP 10 in T934, and displays a scan selection screen D6 in T936. As shown in FIG. 12F, the screen D6 is the same as the setting screen D3 except that a Scan button is displayed instead of the test connection button. Upon accepting an operation on the Scan button in T940, the PC 60 sends a remote scan instruction including the profile 5 to the MFP 10 in T942.

Upon receiving the remote scan instruction from the PC 60 in T942, the MFP 10 identifies that "SMB 1.0" is stored as the SMB version of the profile 5 in this instruction in the profile table 38 and that the network folder path of the profile 5 includes the server name "server5" of the server 100E. In the present case, the MFP 10 cancels execution of the scan_to_Network function since the SMB version is "SMB 1.0". Then, in T944, the MFP 10 sends error screen data to the PC 60.

Upon receiving the error screen data from the MFP 10 in T944, the PC 60 displays an error screen in T946. Thereby, the user can be informed that the scan_to_Network function by using the PC 60 is restricted.

As shown in cases F and G, under the state where "SMB 1.0" is stored as the SMB version in the profile table 38, the MFP 10 executes the scan_to_Network function in the case where the proximity scan instruction is acquired, but does not execute the scan_to_Network function in the case where the remote scan instruction is acquired. Thus, in the case where the remote scan instruction is acquired, it is possible to suppress execution of communication using "SMB 1.0" which has low security strength.

Figure 10:
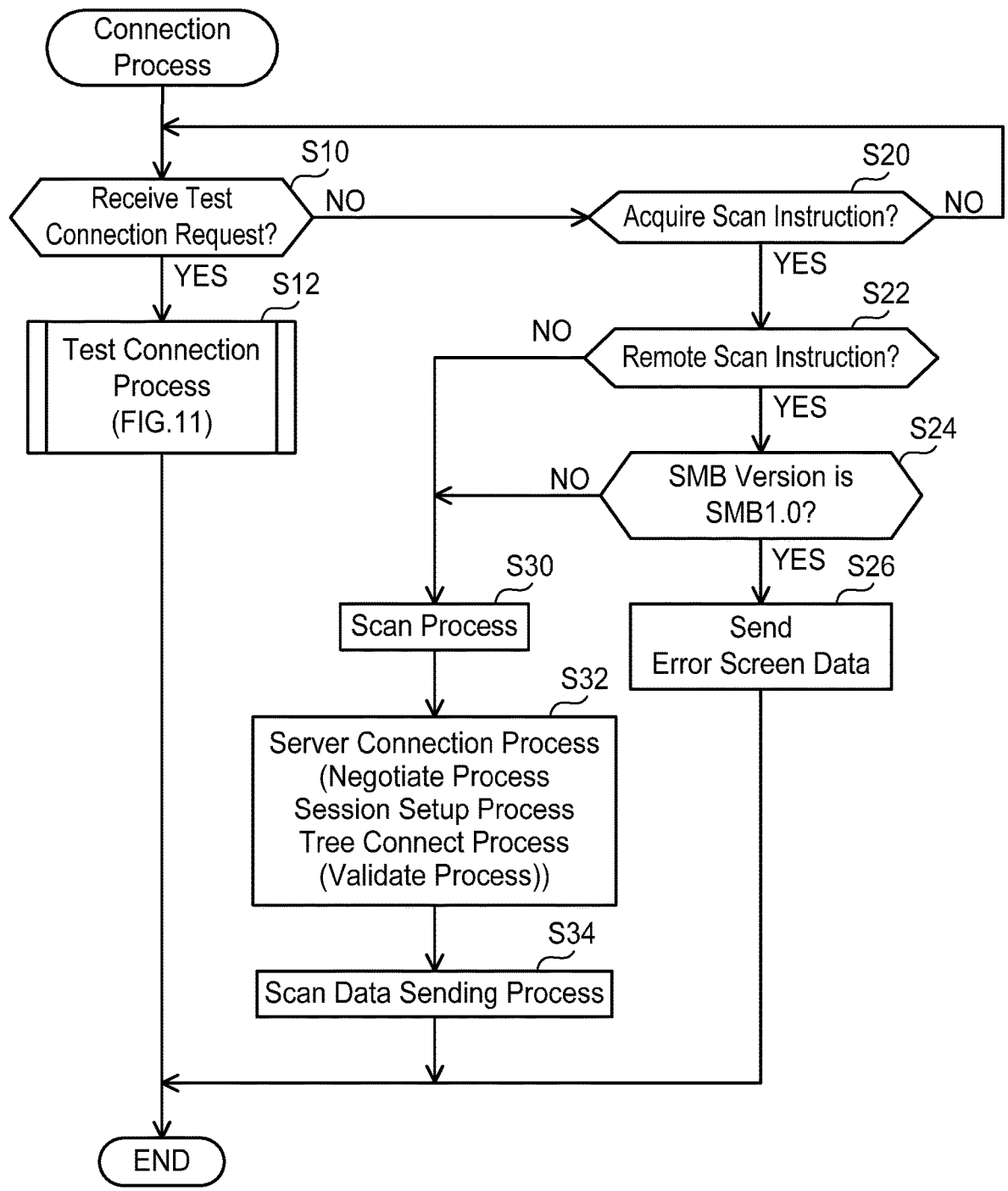
FIG. 10 shows a flowchart of a connection process.

(Connection Process; FIG. 10)

Next, a connection process executed by the CPU 32 of the MFP 10 will be described with reference to FIG. 10. The process of FIG. 10 is started when the power of the MFP 10 is turned on by the user.

In S10, the CPU 32 monitors whether a test connection request is received from the PC. In a case of receiving a test connection request from the PC (YES in S10), the CPU 32 proceeds to S12. The test connection request includes a profile name, a network folder path, a user name and a password.

Figure 11:
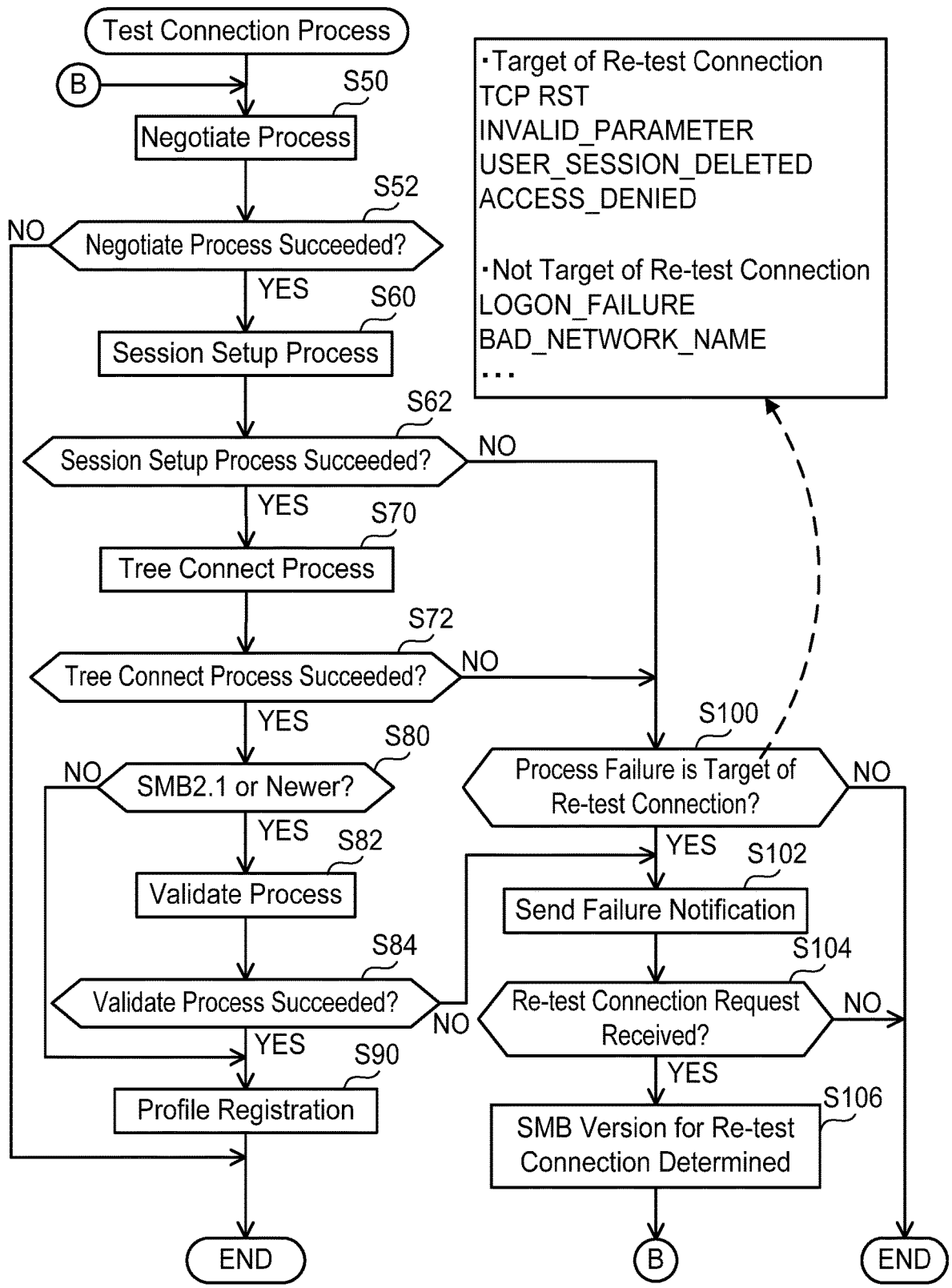
FIG. 11 shows a flowchart of a test connection process.

In S12, the CPU 32 executes a test connection process (FIG. 11). The test connection process is a process of executing a test connection for confirming whether a shared folder in a server can be accessed. When S12 completes, the process of FIG. 10 ends.

Further, the CPU 32 executes monitoring of S20 in parallel with the monitoring of S10. In S20, the CPU 32 monitors whether a scan instruction including a profile name is acquired. Hereinbelow, a profile name in a scan instruction will be called "scan profile name".

In S22, the CPU 32 determines whether the scan instruction is a remote scan instruction. In a case where the scan instruction is a remote scan instruction (YES in S22, case G of FIG. 9), the CPU 32 proceeds to S24. On the other hand, in a case where the scan instruction is a proximity scan instruction (NO in S22, case F of FIG. 8), the CPU 32 proceeds to S30.

In S24, the CPU 32 determines whether the SMB version of the scan profile name is "SMB 1.0" in the profile table 38. In a case where the SMB version is "SMB 1.0" (YES in S24), the CPU 32 proceeds to S26 and executes an error process in S26. In the error process, the CPU 32 sends error screen data to a device that is the sender of the remote scan instruction, without executing the scan_to_Network function. When S26 completes, the process of FIG. 10 ends.

On the other hand, in a case where the SMB version of the scan profile name is "SMB 2.0" or newer, or is empty (NO in S24), the CPU 32 proceeds to S30. In S30, the CPU 32 executes a scan process of scanning a document set on the MFP 10.

In S32, the CPU 32 executes a server connection process for accessing a shared folder of a network folder path corresponding to the scan profile name in the profile table 38. The server connection process includes a Negotiate process, a Session Setup process and a Tree Connect process. Further, in a case where it is determined to use "SMB 2.1" or a newer version in the Negotiate process, the server connection process includes a Validate process.

In S34, the CPU 32 sends scan data to the server. Thereby, the scan data is stored in the shared folder in the server. When S34 completes, the process of FIG. 10 ends.

(Test Connection Process; FIG. 11)

Next, the test connection process executed in S12 of FIG. 10 will be described with reference to FIG. 11. Hereinbelow, a PC that is the source of a test connection request and a server with which the MFP 10 communicates will be called "target PC" and "target server", respectively.

The CPU 32 executes a Negotiate process with the target server in S50 and determines whether the Negotiate process has succeeded in S52. In a case where a Negotiate response is received from the target server in response to a Negotiate request having been sent to the target server, the CPU 32 determines that the Negotiate process has succeeded (YES in S52) and proceeds to S60. On the other hand, in a case where a TCP RST signal is received from the target server, the CPU 32 determines that the Negotiate process has failed (NO in S52) and ends the process of FIG. 11.

The CPU 32 executes a Session Setup process with the target server in S60 and determines in S62 whether the Session Setup process has succeeded. In the Session Setup process, in a case where a Session Setup response including the status "SUCCESS" is received from the target server in response to a Session Setup request having been sent to the target server, the CPU 32 determines that the Session Setup process has succeeded (YES in S62) and proceeds to S70. On the other hand, in a case where a Session Setup response including a status other than the status "SUCCESS" (e.g., "STATUS_LOGON_FAILURE") or a TCP RST signal is received, the CPU 32 determines that the Session Setup process has failed (NO in S62) and proceeds to S100.

The CPU 32 executes a Tree Connect process with the target server in S70 and determines in S72 whether the Tree Connect process has succeeded. In the Tree Connect process, in a case where a Tree Connect response including the status "SUCCESS" is received from the target server in response to a Tree Connect request having been sent to the target server, the CPU 32 determines that the Tree Connect process has succeeded (YES in S72) and proceeds to S80. On the other hand, in a case where a Tree Connect response including a status other than the status "SUCCESS" (e.g., "BAD_NETWORK_NAME") is received in the Tree Connect process, the CPU 32 determines that the Tree Connect process has failed (NO in S72) and proceeds to S100.

In S80, the CPU 32 determines whether the version of the SMB protocol determined in the Negotiate process of S50 is no older than "SMB 2.1". The CPU 32 proceeds to S82 in a case where the determined version is "SMB 2.1" or newer (YES in S80), while it skips S82, S84 and proceeds to S90 in a case where the determined version is "SMB 2.0" or older (NO in S80).

The CPU 32 executes a Validate process with the target server in S82 and determines in S84 whether the Validate process has succeeded. In the Validate process, in a case where a Validate Negotiate Info response is received from the target server in response to a Validate Negotiate Info request having been sent to the target server, the CPU 32 determines that the Validate process has succeeded (YES in S84) and proceeds to S90. On the other hand, in a case where a TCP RST signal is received from the target server, the CPU 32 determines that the Validate process has failed (NO in S84) and proceeds to S102.

In S90, the CPU 32 executes a profile registration. The CPU 32 registers, in the profile table 38, profile information including the network folder path, the user name and the password in the test connection request in association with the profile name in the test connection request.

Further, in S100, the CPU 32 determines whether the failure of the Session Setup process or the Tree Connect process is a target failure of the re-test connection. First, a case in which NO is determined in S62 will be described. In the case of determining NO in S62 due to receipt of a TCP RST signal, the CPU 32 determines that this failure is a target failure of the re-test connection (YES in S100) and proceeds to S102. On the other hand, in a case of determining NO in S62 due to receipt of a Session Setup response including a status other than the status "SUCCESS" (e.g., "STATUS_LOGON_FAILURE"), the CPU 32 determines that this failure is not the target failure of the re-test connection (NO in S100) and ends the process of FIG. 11. The status "STATUS_LOGON_FAILURE" is an error notified in a case where input of a login name or password is incorrect.

Next, a case in which NO is determined in S72 will be described. In a case of determining NO in S72 due to receipt of a Tree Connect response including a status "INVALID_PARAMETER", "USER_SESSION_DELETED", or "ACCESS_DENIED", the CPU 32 determines that this failure is the target failure of the re-test connection (YES in S100) and proceeds to S102. On the other hand, in a case of determining NO in S72 due to receipt of a Tree Connect response including the status "BAD_NETWORK_NAME", the CPU 32 determines that this failure is not the target failure of the re-test connection (NO in S100) and ends the process of FIG. 11. The status "BAD_NETWORK_NAME" is an error notified in a case where input of the network folder path is incorrect.

In other words, the failures to which NO is determined in S100 are failures due to input errors by the user and the like, and the user can handle the failures. On the other hand, the failures to which YES is determined in S100 are failures due to causes other than input error by the user. In this case, it is difficult for the user to handle these failures. User convenience can be improved by executing the re-test connection in the case where it is difficult for the user to handle a failure.

In S102, the CPU 32 sends a failure notification to the target PC. In S104, the CPU 32 determines whether a re-test connection request has been received from the target PC. The CPU 32 proceeds to S106 in a case where a re-test connection request has been received from the target PC (YES in S104). On the other hand, the CPU 32 ends the process of FIG. 11 in a case where a test connection cancellation request has been received from the target PC (NO in S104).

In S106, the CPU 32 determines, as a version of the SMB protocol to be used in the re-test connection with the target server, a version that is only one version older than the version of the SMB protocol that was used in the test connection with the target server, and returns to S50. In this case, in the Negotiate process of S50, the CPU 32 sends, to the target server, a Negotiate request including a version equal to or older than the version of the SMB protocol determined in S106. In S90 after S106, the CPU 32 registers the version of the SMB protocol determined in S106 in the profile table 38 in association with the profile name in the test connection request.

(Effect of Present Embodiment)

In the present embodiment, upon receiving a Negotiate response including "SMB 2.0" from the server 100E, the MFP 10 executes communication using "SMB 2.0" (the Session Setup process, the Tree Connect process) with the server 100E. In this communication, in the case of receiving a Tree Connect response including the status "USER_SESSION_DELETED" from the server 100E (NO in S72), the MFP 10 sends a Negotiate request including "SMB 1.0" to the server 100E (S50 after S106). Then, upon receiving a Negotiate response including "SMB 1.0" from the server 100E, the MFP 10 executes communication using "SMB 1.0", which is an older version than "SMB 2.0" (the Session Setup process, the Tree Connect process), with the server 100E. In this case, it is highly likely that the MFP 10 does not receive a Tree Connect response including the status "USER_SESSION_DELETED" from the server 100E in that communication. As above, in a case of receiving a Tree Connect response including the status "USER_SESSION_DELETED" from the server 100E despite negotiation having been executed normally, the MFP 10 can appropriately execute communication with the server 100E.

(Correspondence Relationships)

The MFP 10 and the PC 60 are examples of "communication device" and "third external device", respectively. The SMB protocol is an example of "predetermined communication protocol". The profile information (folder path, user name, password) is an example of "first setting information". The network folder path of the shared folder "shared51", and the user name and the password in the authentication table of the server 100E are examples of "second setting information". The scan instruction including the profile 5 and the scan instruction including the profile 4 are examples of "first instruction" and "second instruction", respectively. The test connection request and the re-test connection request are examples of "communication request" and "permission notification", respectively. The first connection failure screen D7 and the second connection failure screen D8 are examples of "version selection screen".

In one aspect, the server 100D and the server 100E are examples of "first external device". The Negotiate requests of T460 in FIG. 6 and of T660 in FIG. 7 are examples of "first negotiation request". The Negotiate responses of T470 in FIG. 6 and T662 in FIG. 7 are examples of "first response". The TCP RST signal of T502 in FIG. 6 and the response including the status "USER_SESSION_DE-LETED" of T682 in FIG. 7 are examples of "error notification". The Negotiate requests of T530 in FIG. 6 and of T710 in FIG. 7 are examples of "second negotiation request". The Negotiate responses of T532 in FIG. 6 and T712 in FIG. 7 are examples of "second response". SMB 1.0 or SMB 2.0 is an example of "first version". SMB 2.0 or SMB 2.1 is an example of "second version".

T460 in FIG. 6 or T660 in FIG. 7 is an example of a process executed by "send a first negotiation request including first version information". T480 to T502 in FIG. 6 and T670 to T682 in FIG. 7 are examples of a process executed by "execute first communication with the first external device". T530 in FIG. 6 and T710 in FIG. 7 are examples of a process executed by "send a second negotiation request including second version information". T540 to T552 in FIG. 6 and T720 to T732 in FIG. 7 are examples of a process executed by "execute second communication with the first external device".

In another aspect, the server 100D and the server 100E are examples of "first external device" and "second external device", respectively. SMB 1.0, SMB 2.0, and SMB 2.1 are examples of "first version", "second version", and "third version", respectively. The Negotiate request of T660 in FIG. 7, the Negotiate request of T710 in FIG. 7, the Negotiate request of T830 in FIG. 8, and the Negotiate request of T530 in FIG. 6 are examples of "first negotiation request", "second negotiation request", "third negotiation request", and "fourth negotiation request", respectively. The Negotiate response of T662 in FIG. 7, the Negotiate response of T712 in FIG. 7, and the Negotiate response of T532 in FIG. 6 are examples of "first response", "second response", and "third response".

The Negotiate request including only "SMB 2.0" is an example of "fifth negotiation request".

T660 in FIG. 7 is an example of a process executed by "send a first negotiation request including first version information". T670 to T682 in FIG. 7 is an example of a process executed by "execute first communication with the first external device". T710 in FIG. 7 is an example of a process executed by "send a second negotiation request including second version information". T720 to T732 in FIG. 7 is an example of a process executed by "execute second communication with the first external device".

(Variant 1) Versions in version information included in a Negotiate request may be prioritized. In the present variant, a server that has received the Negotiate request determines a version of the SMB protocol to be used in communication with the MFP 10 based on the priority order of the versions. For example, a situation is assumed in which "SMB 2.?", "SMB 2.0", and "SMB 1.0" are prioritized in this order in the Negotiate request of T660 in FIG. 7. In this case, the server 100E determines that "SMB 2.?", which is the highest priority, cannot be used but "SMB 2.0", which is the second highest priority, can be used, and determines to execute communication with the MFP 10 by using "SMB 2.0". Then, upon receiving the re-test connection request from the PC 60 in T696, the MFP 10 determines that the test connection with the server 100E using "SMB 2.1" has failed, changes the priority of "SMB 1.0", which is an older version than "SMB 2.0", to the highest priority, and sends to the server 100E a Negotiate request including version information with the changed priority. That is, in the present variant, the Negotiate request of T710 includes SMB "2.?", "SMB 2.0" and "SMB 1.0". In this case, the server 100E determines that "SMB 1.0", which is the highest priority, can be used and executes communication with the MFP 10 by using "SMB 1.0". Thereafter, the same processes as T710 to T742 are executed between the MFP 10 and the server 100E. Such a configuration can also bring the same effect as the embodiment.

(Variant 2) In the test connection process of FIG. 11, the CPU 32 may send the failure notification to the target PC regardless of the reason of failure. In the present variant, S100 can be omitted.

(Variant 3) In S90 after S106 in FIG. 11, the CPU 32 may not register the SMB version. That is, in the present variant, no SMB version is included in the profile information in the profile table 38. In this case, in case F of FIG. 8, the same processes as T660 to T682 and T710 to T732 in FIG. 7 are executed between the MFP 10 and the server 100E instead of the processes of T830 to T852, and then T860 to T864 are executed. That is, "store the first version in the memory", "send a third negotiation request", "store the second version in association with second external device information" and "send a fifth negotiation request" can be omitted.

(Variant 4) S22 to S26 in FIG. 10 can be omitted. That is, in a case where the scan instruction is acquired, the CPU 32 may execute the processes of S30 to S34.

(Variant 5) In the test connection process of FIG. 11, the CPU 32 may not send the failure notification including the connection failure screen data to the target PC in the case of determining YES in S100. In the present variant, the CPU 32 executes the process of S106 without receiving a re-test connection request from the target PC. In the present variant, S102 and S104 can be omitted. That is, "send version selection screen data" can be omitted.

(Variant 6) In the second connection failure screen D8, the message indicating that it is concerned that security strength may be lowered may not be displayed.

(Variant 7) "First external device" is not limited to a server, and may be a computer capable of creating a shared folder, such as a PC.

(Variant 8) "Communication device" may not be the MFP 10 capable of executing the plurality of functions, and may be a scanner capable of executing only the scan function.

(Variant 9) In the above embodiment, the processes executed by the controller 30 are realized by software (i.e., the program 36). However, at least one of these processes may be realized by hardware, such as a logic circuit.

What is claimed is:

1. A communication device comprising:
 a communication interface;
 a processor; and
 a memory storing computer-readable instructions therein, the computer-readable instructions, when executed by the processor, causing the communication device to:
 send a first negotiation request including first version information to a first external device via the communication interface, the first version information indicating that the communication device is capable of using a Server Message Block (SMB) protocol of a plurality of versions, the plurality of versions including a first version of the SMB protocol and a second version of the SMB protocol newer than the first version;

execute first communication with the first external device via the communication interface by using the SMB protocol of the second version in a case where a first response to the first negotiation request is received from the first external device via the communication interface, the first response indicating that the first external device is capable of using the SMB protocol of the second version;

send a second negotiation request including second version information different from the first version information to the first external device via the communication interface in a case where an error notification is received from the first external device in the first communication, the second version information indicating that the communication device is capable of using the SMB protocol of the first version; and execute second communication with the first external device via the communication interface by using the SMB protocol of the first version in a case where a second response to the second negotiation request is received from the first external device via the communication interface, the second response indicating that the first external device is capable of using the SMB protocol of the first version.

2. The communication device as in claim 1, wherein the second version information does not indicate that the communication device is capable of using the SMB protocol of the second version even though the communication device is capable of using the SMB protocol of the second version.

3. The communication device as in claim 1, wherein the first version is version 1.0 of the SMB protocol, and the second version is version 2.0 or a newer version of the SMB protocol.

4. The communication device as in claim 1, wherein the first communication includes communication in which the communication device sends a Validate Negotiation Info Request signal of the SMB protocol to the first external device via the communication interface, and the error notification is a signal indicating that the first external device is incapable of interpreting the Validate Negotiation Info Request signal.

5. The communication device as in claim 4, wherein the error notification is a notification that is communicated by using a lower layer protocol than the SMB protocol in an Open Systems Interconnection (OSI) model.

6. The communication device as in claim 1, wherein the first communication includes communication in which the communication device sends a Tree Connect Request signal of the SMB protocol to the first external device via the communication interface, and the error notification is a notification including any of STATUS_USER_SESSION_DELETED, STATUS_INVALID_PARAMETER, and STATUS_ACCESS_DENIED.

7. The communication device as in claim 1, wherein the first communication is communication for confirming whether first setting information matches second setting information stored in the first external device, the first setting information being used for communication of target data with the first external device, the first setting information being inputted by a user, and in a case where the error notification is a notification indicating that the first setting information does not match the second setting information, the second negotiation request is not sent to the first external device.

8. The communication device as in claim 1, wherein the computer-readable instructions, when executed by the processor, further cause the communication device to:

store the first version in the memory in a case where a success notification is received from the first external device via the communication interface in the second communication; and send a third negotiation request including third version information different from the first version information to the first external device via the communication interface in a case where a first instruction for executing communication of target data with the first external device is acquired under a state where the first version is stored in the memory, the third version information indicating that the communication device is capable of using the SMB protocol of the first version stored in the memory.

9. The communication device as in claim 8, wherein the first version is stored in association with first external device information related to the first external device, and the plurality of versions further includes a third version newer than the second version, wherein the computer-readable instructions, when executed by the processor, further cause the communication device to:

execute third communication with a second external device via the communication interface according to the SMB protocol of the third version;

send a fourth negotiation request including fourth version information different from the first version information to the second external device in a case where an error notification is received from the second external device in the third communication, the fourth version information indicating that the communication device is capable of using the SMB protocol of the first and second versions;

execute fourth communication with the second external device via the communication interface by using the SMB protocol of the second version in a case where a third response to the fourth negotiation request is received from the second external device via the communication interface, the third response indicating that the second external device is capable of using the SMB protocol of the second version;

store the second version in association with second external device information related to the second external device in the memory in a case where a success notification is received from the second external device via the communication interface in the fourth communication; and send a fifth negotiation request including fifth version information to the second external device via the communication interface in a case where a second instruction for executing communication of target data with the second external device is acquired under a state where the second version is stored in association with the second external device information in the memory, the second instruction including designation of the second external device information, the fifth version information indicating that the communication device is capable of using the SMB protocol of the second version associated with the second external device information, wherein the third negotiation request including the third version information indicating that the communication device is capable of using the SMB protocol of the first version associated with the first external device information is sent to the first external device in a case where the first instruction including designation of the first external device is acquired under a state where the first version is stored in association with the first external device information in the memory.

10. The communication device as in claim 8, further comprising:

an operation unit, wherein in a case where the first instruction is acquired by a user operation being executed on the operation unit under the state where the first version is stored in the memory, the third negotiation request is sent to the first external device, and in a case where the first instruction is acquired by a web server within the communication device being accessed under the state where the first version is stored in the memory, the third negotiation request is not sent to the first external device.

11. The communication device as in claim 1, wherein the computer-readable instructions, when executed by the processor, further cause the communication device to:

receive a communication request from a third external device different from the first external device via the communication interface, wherein in a case where the communication request is received from the third external device, the first negotiation request is sent to the first external device, and send version selection screen data representing a version selection screen to the third external device via the communication interface in a case where the error notification is received from the first external device in the first communication with the first external device according to the SMB protocol of the second version, the version selection screen being a screen for allowing a user to select whether to use a version older than the second version, wherein in a case where a permission notification is received from the third external device via the communication interface, the second negotiation request is sent to the first external device, the permission notification indicating that using the older version is selected in the version selection screen by the user.

12. The communication device as in claim 11, wherein the version selection screen includes a message indicating that a security level is lowered due to using the older version.

13. A non-transitory computer-readable recording medium storing computer-readable instructions for a communication device, wherein the computer-readable instructions, when executed by a processor of the communication device, cause the communication device to:

send a first negotiation request including first version information to a first external device via a communication interface of the communication device, the first version information indicating that the communication device is capable of using a Server Message Block (SMB) protocol of a plurality of versions, the plurality of versions including a first version of the SMB protocol and a second version of the SMB protocol newer than the first version;

execute first communication with the first external device via the communication interface by using the SMB protocol of the second version in a case where a first response to the first negotiation request is received from the first external device via the communication interface, the first response indicating that the first external device is capable of using the SMB protocol of the second version;

send a second negotiation request including second version information different from the first version information to the first external device via the communication interface in a case where an error notification is received from the first external device in the first communication, the second version information indicating that the communication device is capable of using the SMB protocol of the first version; and execute second communication with the first external device via the communication interface by using the SMB protocol of the first version in a case where a second response to the second negotiation request is received from the first external device via the communication interface, the second response indicating that the first external device is capable of using the SMB protocol of the first version.

14. A method executed by a communication device, the method comprising:

sending a first negotiation request including first version information to a first external device via a communication interface of the communication device, the first version information indicating that the communication device is capable of using a Server Message Block (SMB) protocol of a plurality of versions, the plurality of versions including a first version of the SMB protocol and a second version of the SMB protocol newer than the first version;

executing first communication with the first external device via the communication interface by using the SMB protocol of the second version in a case where a first response to the first negotiation request is received from the first external device via the communication interface, the first response indicating that the first external device is capable of using the SMB protocol of the second version;

sending a second negotiation request including second version information different from the first version information to the first external device via the communication interface in a case where an error notification is received from the first external device in the first communication, the second version information indicating that the communication device is capable of using the SMB protocol of the first version; and executing second communication with the first external device via the communication interface by using the SMB protocol of the first version in a case where a second response to the second negotiation request is received from the first external device via the communication interface, the second response indicating that the first external device is capable of using the SMB protocol of the first version.

15. A communication device comprising:

a communication interface;

a processor; and a memory storing computer-readable instructions therein, the computer-readable instructions, when executed by the processor, causing the communication device to:

send a first negotiation request including first version information to a first external device via the communication interface, the first version information indicating that the communication device is capable of using a predetermined communication protocol of a plurality of versions, the plurality of versions including a first version and a second version newer than the first version;

execute first communication with the first external device via the communication interface by using the predetermined communication protocol of the second version in a case where a first response to the first negotiation request is received from the first external device via the communication interface, the first response indicating that the first external device is capable of using the predetermined communication protocol of the second version, the first communication for confirming whether first setting information matches second setting information stored in the first external device, the first setting information being used for communication of target data with the first external device, the first setting information being inputted by a user;

send a second negotiation request including second version information different from the first version information to the first external device via the communication interface in a case where an error notification is received from the first external device in the first communication, the second version information indicating that the communication device is capable of using the predetermined communication protocol of the first version, wherein in a case where the error notification is a notification indicating that the first setting information does not match the second setting information, the second negotiation request is not sent to the first external device; and execute second communication with the first external device via the communication interface by using the predetermined communication protocol of the first version in a case where a second response to the second negotiation request is received from the first external device via the communication interface, the second response indicating that the first external device is capable of using the predetermined communication protocol of the first version.

* * * * *